(12) United States Patent
Koyama

(10) Patent No.: US 7,047,094 B2
(45) Date of Patent: May 16, 2006

(54) LSI MASK MANUFACTURING SYSTEM, LSI MASK MANUFACTURING METHOD AND LSI MASK MANUFACTURING PROGRAM

(75) Inventor: Kiyomi Koyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 404 days.

(21) Appl. No.: 10/397,543

(22) Filed: Mar. 26, 2003

(65) Prior Publication Data
US 2003/0188289 A1 Oct. 2, 2003

(30) Foreign Application Priority Data
Mar. 27, 2002 (JP) ............................ P2002-090029

(51) Int. Cl.
*G06F 19/00* (2006.01)
(52) U.S. Cl. .................. 700/97; 700/100; 700/120; 700/121; 700/182; 716/19; 216/12
(58) Field of Classification Search .................. 700/97, 700/100, 121, 182; 716/19; 216/12
See application file for complete search history.

(56) References Cited

U.S. PATENT DOCUMENTS

| | | | |
|---|---|---|---|
| 4,531,191 A | 7/1985 | Koyama | |
| 4,538,232 A | 8/1985 | Koyama | |
| 5,694,325 A | 12/1997 | Fukuda et al. | |
| 5,861,866 A * | 1/1999 | Inoue et al. | ................. 345/643 |
| 6,051,347 A * | 4/2000 | Tzu et al. | ..................... 430/30 |
| 6,347,258 B1 * | 2/2002 | Hsu et al. | ................... 700/121 |

FOREIGN PATENT DOCUMENTS

| | | |
|---|---|---|
| EP | 0 507 589 A2 | 10/1992 |
| EP | 0 782 068 A1 | 7/1997 |

(Continued)

OTHER PUBLICATIONS

C. Ou-Yang et al., "Developing a computer shop floor control model for a CIM system—using object modeling technique", Computers In Industry, Elsevier Science Publishers, Amsterdam, NL, vol. 41, No. 3, May 2000, pp. 213-238, XP004194248, ISSN: 0166-3615.

(Continued)

*Primary Examiner*—Leo Picard
*Assistant Examiner*—Michael D. Masinick
(74) *Attorney, Agent, or Firm*—Kilpatrick Stockton LLP

(57) ABSTRACT

A computer implemented method for LSI mask manufacturing stores performance information of a lithography unit, connected to a network, in a lithography unit database. The method receives a lithography data and a lithography reservation condition from a user terminal connected to the network. The method stores the lithography data in a lithography data database. The method searches for a lithography unit matching to the lithography reservation condition, generating a list of lithography units, and sending the list to the user terminal. In addition, the method receives information of a lithography unit specified by the user terminal and sending a lithography request to the lithography unit specified by the user terminal.

20 Claims, 23 Drawing Sheets

FOREIGN PATENT DOCUMENTS

| | | |
|---|---|---|
| EP | 1 150 187 A2 | 10/2001 |
| JP | 2002-075820 | 3/2002 |
| JP | 2002-092062 | 3/2002 |
| JP | 2002-149754 | 5/2002 |

OTHER PUBLICATIONS

Semiconductor Equipment and Materials International: "SEMI P10-0301 Standard, pp. 1-3, 14, 17, 23, 26-27", Mar. 2001, Semiconductor Equipment and Materials International, San Jose, CA XP002258143.

Michael B. McIlrath et al., "CAFE—The MIT Computer Aided Fabrication Environment", IEEE CHMT '90 IEMT Symposium, Oct. 1, 1990, pp. 297-305, XP010092202.

Albert Hu et al., "Concurrent Deployment of Run by Run Controller Using Scc Framework", Semiconductor Manufacturing Science Symposium, 1993, ISMSS 1993, IEEE/SEMI International San Francisco, CA, USA 19-20, Jul. 1993, New York, NY USA, IEEE, US, Jul. 19, 1993, pp. 125-132, XP010068452, ISBN: 0-7803-1212-0.

Douglas Scott, "Fab Automation—Where's the Payback?", IEEE/SEMI Advanced Semiconductor Manufacturing Conference, Sep. 12, 2000, pp. 168-174, XP010531540.

Fan-Tien Cheng et al., "Modeling and analysis for an equipment manager of the manufacturing execution system in semiconductor packaging factories", Systems, Man, and Cybernetics, 1998, 1998 IEEE International Conference on San Diego, CA, USA Oct. 11-14, 1998, New York, NY, USA, IEEE, US, Oct. 11, 1998, pp. 469-474, XP010310522, ISBN: 0-7803-4778-1.

Xiewei Bai et al., "Hierarchical real-time scheduling of a semiconductor fabrication facility", IEEE/CHMT '90 IEMT Symposium, Oct. 1, 1990, pp. 312-317, XP010092204.

Eugene S. Meieran et al., "Applications of artificial intelligence in factory management", IEEE/CHMT '89 IEMT Symposium, Sep. 25, 1989, pp. 18-22, XP010085260.

\* cited by examiner

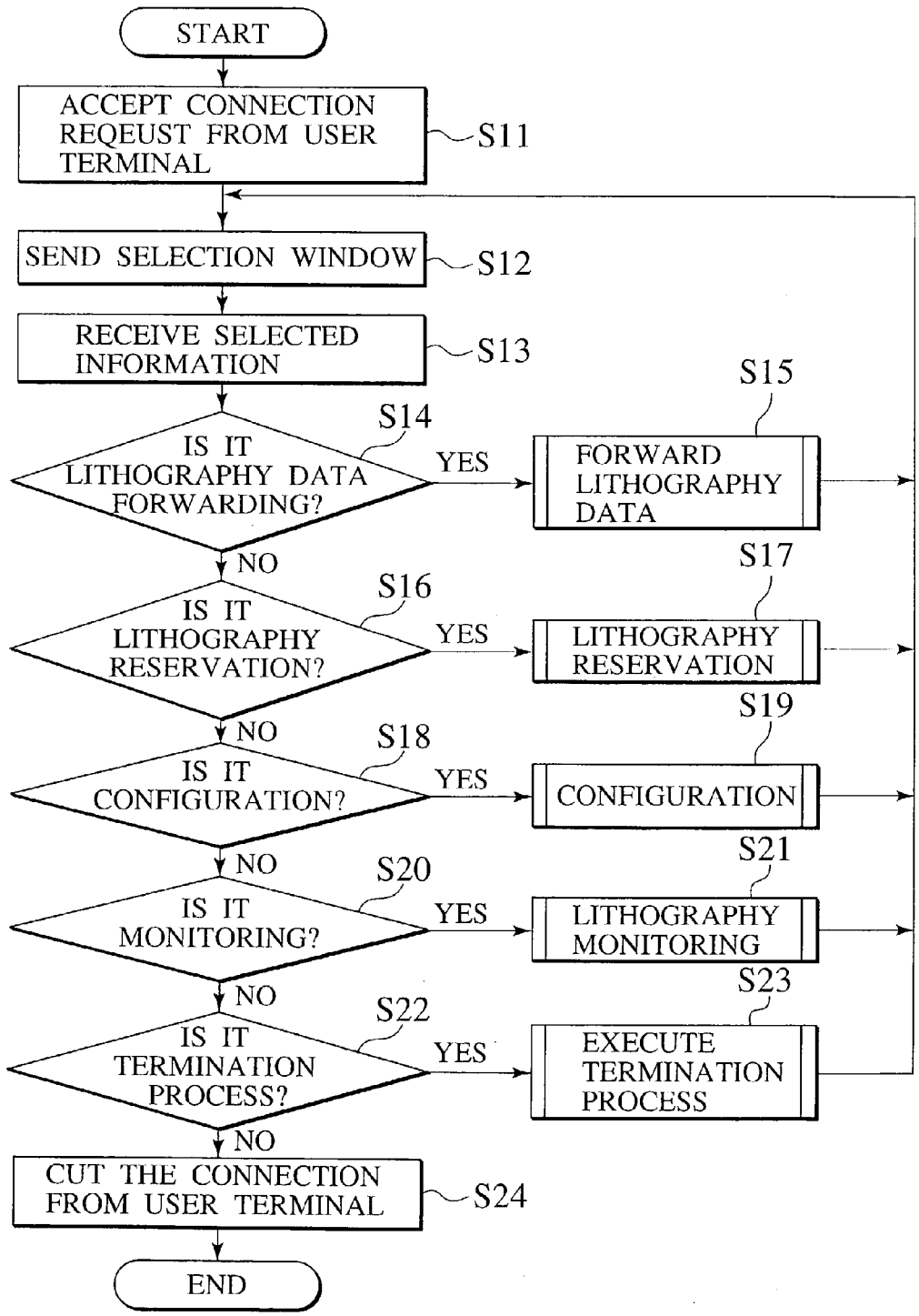

FIG. 9

SEARCH RESULT DISPLAY WINDOW 44

USER ID : 356 - 102 - Q04772

| | SITE | DEVICE NAME | TYPE | RESOLUTION | STARTING TIME | RESERVATION TIME | COST (K¥) |
|---|---|---|---|---|---|---|---|
| 1 | DOMESTIC B | 1ST LITHO UNIT | EB | 0.01 μm | 2001/06/03 10:00 | 04H00M | 600 |
| 2 | DOMESTIC B | 2ND LITHO UNIT | EB | 0.01 μm | 2001/06/03 18:30 | 04H30M | 550 |
| 3 | DOMESTIC B | 1ST LITHO UNIT | EB | 0.01 μm | 2001/06/04 08:00 | 04H00M | 600 |
| 4 | DOMESTIC A | 3RD LITHO UNIT | EB | 0.01 μm | 2001/06/03 20:30 | 03H50M | 680 |
| 5 | FOREIGN C | 1ST LITHO UNIT | EB | 0.01 μm | 2001/06/03 11:30 | 04H30M | 500 |

RESERVATION NUMBER: 1

LSI MASK MANUFACTURING SYSTEM, LSI MASK MANUFACTURING METHOD AND LSI MASK MANUFACTURING PROGRAM

CROSS REFERENCE TO RELATED APPLICATIONS

This application is based upon and claims the benefit of priority from prior Japanese Patent Application P2002-090029 filed on Mar. 27, 2002; the entire contents of which are incorporated by reference herein.

BACKGROUND OF THE INVENTION

1. Field of the Invention

The present invention relates to methods, systems and programs for manufacturing masks of a large scale integrated (LSI) system.

2. Description of the Related Art

Generally, masks or reticles are needed to be produced depending on each semiconductor manufacturing process. Therefore, first, mask data, corresponding to each of a plural number of masks, are generated by using a computer-aided design (CAD) system based on design of an LSI. Then, masks that can be put on top of one another are generated by using a pattern generator, such as an electron beam writer, and a mask set is completed. Furthermore, each of the masks is checked. Finally, the masks, after the examination, are going to be used in a semiconductor manufacturing process.

Generally, customers, such as semiconductor manufacturing makers and semiconductor foundry, specifies a mask specification, specific numbers, and delivery time to order masks to a mask house, and the mask house delivers masks before the delivery time. However, in such a conventional mask manufacturing methods and system, all the selection of a schedule and machines (such as pattern generators) is entrusted to a decision of the mask manufacturing house side, where a customer is not able to choose any schedule or machines. Thus, it has been difficult for the manufacturer to prepare masks urgently when the mask design has changed or other things happen.

In addition, conventional method and system for procuring masks are provided for big customers, who order and entrust a large quantity of mask manufacturing. Therefore, small customers, who order a small quantity of mask manufacturing, are difficult to order, and they may loose business chances.

Furthermore, there is a security problem concerning a mask manufacturing. Therefore, masks to be manufactured in an absolute secrecy in the research and development may not be possible in the conventional mask manufacturing method and system. In addition, in a mask house, a factor for raising a cost price of a semiconductor manufacturing is personnel expenses for operating manufacturing devices in a plural number of places (or sites).

SUMMARY OF THE INVENTION

An LSI mask manufacturing system includes: a network; a portal site server configured to be connected to the network; a user terminal configured to be connected to the portal site server; a host terminal configured to be connected to the network; and a lithography units configured to be connected to the host terminal.

An LSI mask manufacturing system, includes: a network; a portal site server configured to be connected to the network; a user terminal configured to connected to the portal site server; a host terminal configured to connected to the network; and a mask manufacturing unit configured to connected to the host terminal.

A computer implemented method for LSI mask manufacturing includes: storing performance information of a lithography unit, connected to a network, in a lithography unit database; receiving a lithography data and a lithography reservation condition from a user terminal connected to the network; storing the lithography data in a lithography data database; searching for a lithography unit matching to the lithography reservation condition, generating a list of lithography units, and sending the list to the user terminal; and receiving information of a lithography unit specified by the user terminal and sending a lithography request to the lithography unit specified by the user terminal.

A computer implemented method for LSI mask manufacturing, the method includes: storing performance information of a mask manufacturing unit, connected to a network, in a mask manufacturing unit database; receiving data and a reservation condition from a user terminal connected to the network; storing the data in a mask manufacturing data database; determining a ordered range based on the reservation condition; searching for a mask manufacturing unit marching to the reservation condition, generating a list of mask manufacturing units, and sending the list to the user terminal; and receiving information of a mask manufacturing unit specified by the user terminal and sending a request to the mask manufacturing unit specified by the user terminal.

A computer program product for use with a mask manufacturing unit, the computer program product includes: instructions to store performance information of a lithography unit, connected to a network, in a lithography unit database; instructions to receive a lithography data and a lithography reservation condition from a user terminal connected to the network; instructions to store the lithography data in a lithography data database; instructions to search for a lithography unit matching to the lithography reservation condition, generate a list of lithography units, and send the list to the user terminal; and instructions to receive information of a lithography unit specified by the user terminal and send a lithography request to the lithography unit specified by the user terminal.

A computer program product for use with a mask manufacturing unit the computer program product includes: instructions to store performance information of a mask manufacturing unit, connected to a network, in a mask manufacturing unit database; instructions to receive data and a reservation condition from a user terminal connected to the network; instructions to store the data in a mask manufacturing data database; instructions to determine a ordered range based on the reservation condition; instructions to search for a mask manufacturing unit matching to the reservation condition, generate a list of mask manufacturing units, and send the list to the user terminal; and instructions to receive information of a mask manufacturing unit specified by the user terminal and send a request to the mask manufacturing unit specified by the user terminal.

BRIEF DESCRIPTION OF DRAWINGS

FIG. 3A and FIG. 3B are flowcharts illustrating the LSI mask manufacturing method according to the first embodiment of the present invention.

FIG. 9 is an example of the search result display window of the first embodiment of the present invention.

DETAILED DESCRIPTION OF EMBODIMENTS

Figure 1:
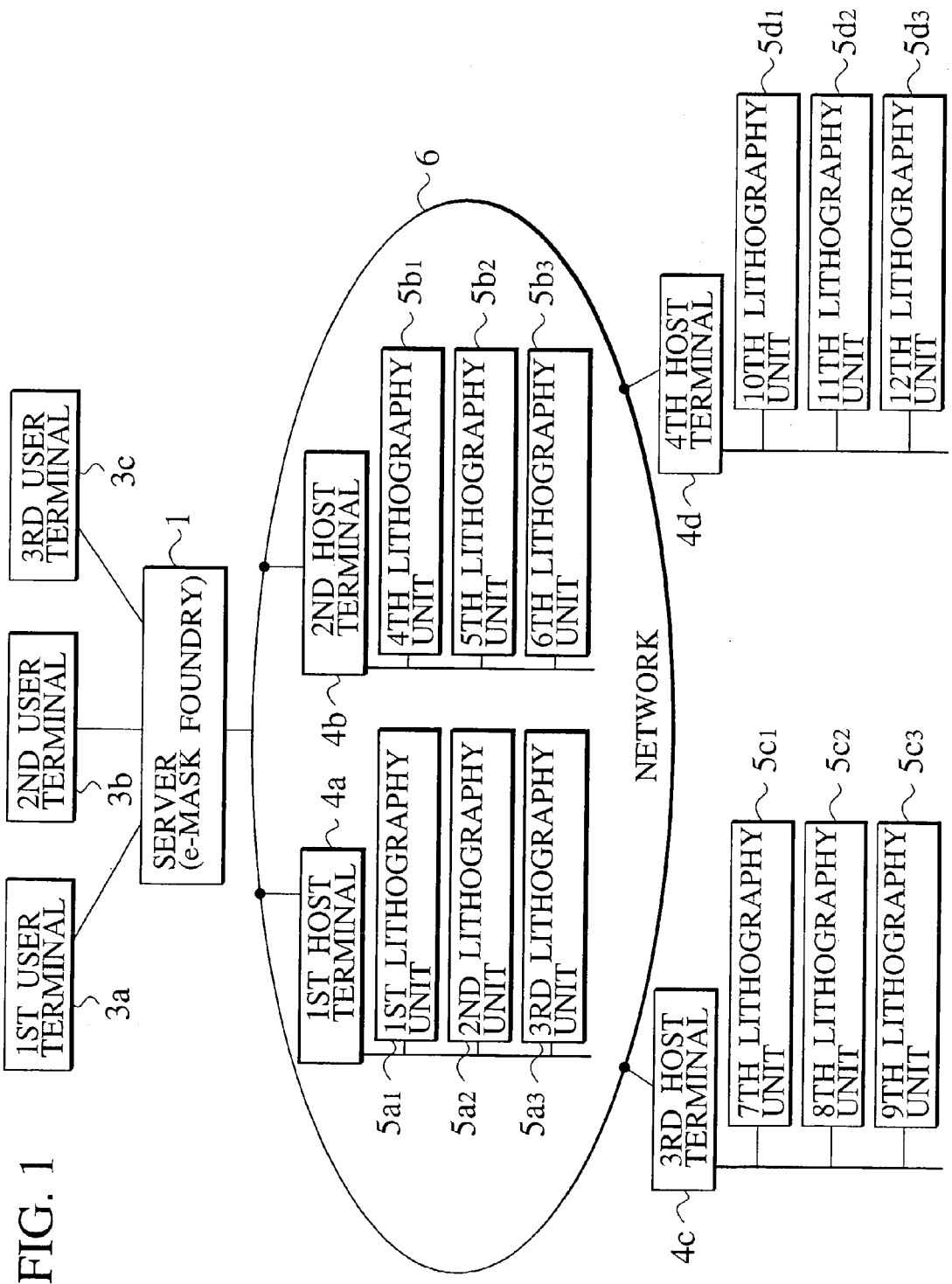
FIG. 1 is a conceptual diagram illustrating the LSI mask manufacturing system according to the first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details in other instances, well-known circuits have been shown in block diagram form in order not to obscure the present invention in unnecessary detail.

FIRST EMBODIMENT

Architecture of a Lithography System

Figure 2:
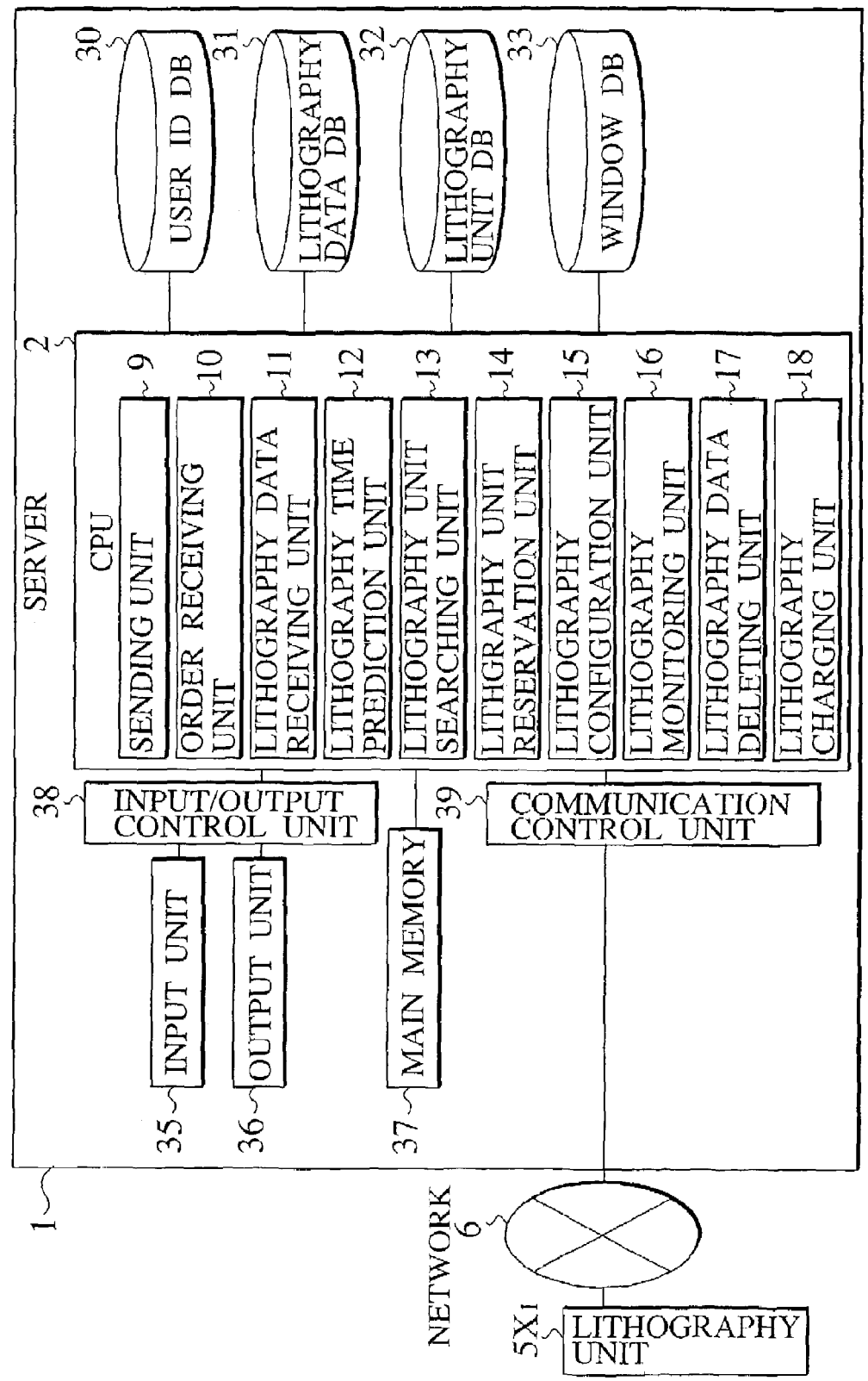
FIG. 2 is a block diagram illustrating a portal site server 1 shown in FIG. 1.

As shown in FIG. 1 and FIG. 2, an LSI mask manufacturing system according to the first embodiment of the present invention includes a portal site server 1, a first user terminal 3a, a second user terminal 3b, a third user terminal 3c, a first host terminal 4a having a first lithography unit $5a_1$, a second lithography unit $5a_2$, and a third lithography unit $5a_3$, a second host terminal 4b having a fourth lithography unit $5b_1$, a fifth lithography unit $5b_2$ and a sixth lithography unit $5b_3$, a third host terminal 4c having a seventh lithography unit $5c_1$, an eighth lithography unit $5c_2$ and a ninth lithography unit $5c_3$, a fourth host terminal 4d having a tenth lithography unit $5d_1$, an eleventh lithography unit $5d_2$ and a twelfth lithography unit $5d_3$, and a network 6 connecting the portal site server 1, the user terminals 3a–3c and the host terminals 4a–4d.

In the first embodiment of the present invention, Internet is proposed as one example of network 6. However, other networks such as LAN or a personal computer communication network are alternatives and preferable. In addition, all of the first host terminal 4a, the second host terminal 4b, the third host terminal 4c, and the fourth host terminal 4d may be connected to network 6 in one country or in a plural countries. For example, it is possible to do that the first host terminal 4a and the second host terminal 4b are connected to network 6 in Japan, the third host terminal 4c is connected to network 6 in the U.S.A., and the fourth host terminal 4d may be connected to network 6 in Germany.

The portal site server 1 accepts request of the first user terminal 3a, the second user terminal 3b, and the third user terminal 3c, and reserves one of the first lithography unit 5a1 through the twelfth lithography unit 5a12, which is connected to the first host terminal 4a through the fourth host terminal 4d and conforming the user request. The first user terminal 3a, the second user terminal 3b, and the third user terminal 3c are possible to communicate with the portal site server 1. Through the portal site server 1, the first user terminal 3a, the second user terminal 3b, and the third user terminal 3c search lithography units, further connected to the first host terminal 4a through the fourth host terminal 4d, and request for a reservation, Each of the first lithography unit $5a_1$ through the twelfth lithography unit $5d_3$ are connected to one of the first host terminal 4a through the fourth host terminal 4d. The first host terminal 4a through the fourth host terminal 4d accepts an order of the user from portal site server 1 by using the network 6. A completed mask is delivered to the user using a conveyance by land or air.

Each of the portal site server 1, the first through the third user terminals 3a–3c, the first through fourth host terminal 4a–4d includes CPU, an input device, output device, main memory unit, and an secondary memory (a hard disk). Then, each of the CPU analyzes received message from the network 6 and includes an online control unit, which executes the requested processes. In addition, the CPU also includes a communication control unit to transmit received messages to this online control unit through the network 6. Furthermore, CPU 2, located on the portal site server 1, includes a database management unit. When the inputs and outputs is needed for the user ID database 30, the lithography data database 31, the lithography unit database 32, and the window database 33, the database control unit searches for the place to store files, retrieves requested files and edit the files.

As is shown in FIG. 2, the portal site server 1 includes an input unit 35, an output unit 36, a main memory 37, an input/output control unit 38, a communication control unit 39, the user ID database 30, the lithography data database 31, the lithography unit database 32, the window database 33, and CPU 2. The user ID database 30, the lithography data database 31, the lithography unit database 32 and the window database 33 are stored in the portal site server 1. In addition, the user ID database 30, the lithography data database 31, the lithography unit database 32 and the window database 33 may be connected through the database servers.

User ID database 30 stores an identification number given to each user. From the identification number stored in the user ID database 30, it is possible to acquire information where the data is stored. The lithography data database 31 is a memory storage to temporary store a lithography data of the LSI masks that the user received from the first through third user terminal 3a–3c. The lithography unit 32 stores the information of each of the lithography unit $5a_1$–$5d_3$ connected to one of the host terminals 4a–4d, and searches for lithography unit, which meets the user needs. The window database 33 is a data storage device to store windows for various services providing at the portal site server 1.

Furthermore, CPU 2 of portal site server 1 comprises sending unit 9, order receiving unit 10, lithography data receiving unit 11, lithography time prediction unit 12, lithography unit searching unit 13, lithography unit reservation unit 14, lithography configuration unit 15, lithography monitoring unit 16, lithography data deleting unit 17, lithography unit charging unit 18.

The sending unit 9 selects each window stored in the window database 33 based on a request from the first user terminal 3a through the third user terminal 3c appropriately and sends selected window to one of the user terminals 3a–3c. The order receiving unit 10 receives a mask lithography request from the user terminals 3a–3c. The lithography data receiving unit 11 receives a lithography data from the user terminals 3a–3c. The lithography time prediction unit 12 estimates the time required for a mask lithography in the lithography unit $5x_1$.

The user determines the reservation time of the lithography unit $5x_1$ based on the duration, which the lithography time prediction unit 12 predicted. The lithography unit searching unit 13 searches for the most suitable lithography unit $5x_1$ based on the lithography conditions received from the user terminals 3a through 3c. The lithography unit reservation unit 14 reserves the lithography unit $5x_1$ based on the request from the first through third user terminals 3a–3c. The lithography configuration unit 15 configures the mask lithography conditions at the lithography unit $5x_1$. In addition, the user may manually configure the lithography configuration unit 15 by using the first user terminal 3a through the third user terminal 3c. In addition, the user is also able to select automatically the configurations the lithography conditions. The lithography monitoring unit 16 receives lithography state from the lithography unit $5x_1$, and send the lithography states to the first user terminal 3a through the third user terminal 3c. The lithography data deleting unit 17 receives the deleting data from the first user terminal 3a through the third user terminal 3c based on the request, and deletes the lithography data stored in the lithography data database 31. Lithography unit charging unit 18 charges to the first user terminal 3a through the third user terminal 3c based on an actual time the lithography unit $5x_1$ was in use, and clear the mask lithography service provided by the LSI mask lithographing system.

The input unit 35 may include a key board, a mouse and an optical character reader (OCR) or similar recognition device a graphics input unit such as an image scanner, or a special input unit such as a voice pattern recognition unit, while the output unit 36 may include a display unit such as a liquid crystal display, a cathode ray tube (CRT) display, or a printer such as an ink jet printer or a laser printer.

The input/output control unit (the input/output interface unit) 38 is an interface which connects the input unit 35, output unit 36, reading unit which reads data from storage media such as a compact disk read only memory (CD-ROM), a magnetic optical disk (MO) or a flexible disk (FD), to the CPU 2. The main memory 37 includes a read only memory (ROM) and a random access memory (RAM). The ROM functions as a program memory for storing programs to be executed in the CPU2. The RAM functions as a temporary data memory used as a working area for temporarily storing data used during program execution in the CPU2. The communication control device 24 is an interface for connecting with the network 6. Accordingly, this may be, for example, a Terminal Adapter (TA), a dial-up router, or a LAN board. In addition, this may even be data circuit-terminating equipment such as a modem, a digital service unit (DSU), a communication control unit (CCU), or a communication control processor (CCP).

Figure 3A:
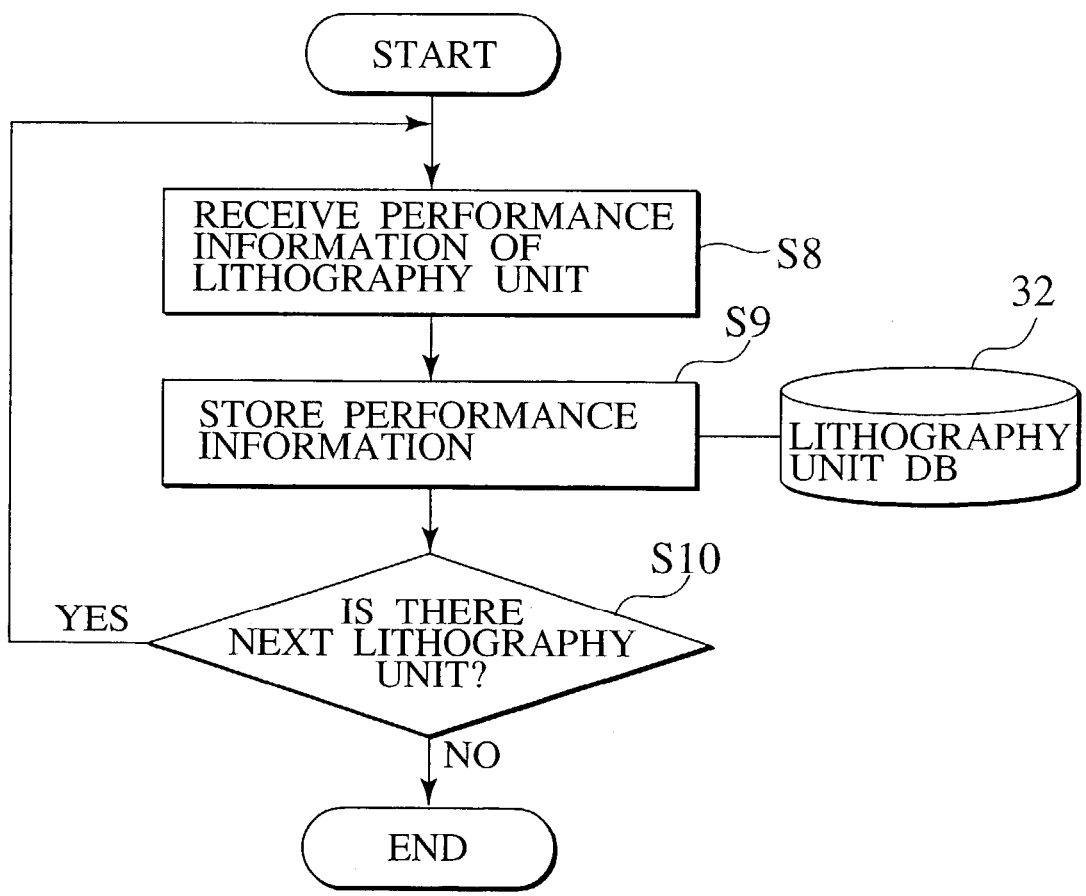

LSI Mask Manufacturing System Related to the First Embodiment of the Present Invention As shown in FIG. 3A and FIG. 3B, the LSI mask lithographing method of the first embodiment of the present invention will be explained.

(a) First, in step 8 of FIG. 3A, the portal site server 1 receives the detailed performance information of the lithography unit from each of the first to the twelfth lithography unit $5a_1$–$5d_3$, connected to one of the first to the fourth host terminals. Then, in step S9, the portal site server 1 stores the detailed performance information of the first to the twelfth lithography unit $5a_1$–$5d_3$ in the lithography unit database 32. In step S10, it is determined whether or not there is a next lithography unit, and when there is the next lithography unit, which the lithography unit database 32 does not yet receives performance information, processes from step S8 to step S10 are repeated. If the lithography unit database 32 receives all of the performance information of the lithography unit, the receiving process of the lithography unit is finished, and the process proceeds to a process in step S11.

(b) In step S11 of FIG. 3B, the portal site server 1 accepts a connection request from one of the first through the third user terminal 3a–3c. In the first embodiment of the present invention, the portal site server 1 accepts connection from the first user terminal 3a in order to make the description easier. Then, in step S12, the sending unit 9 of the portal site server 1 transmits a service selection window to the first user terminal 3a. In this service selection window, the user may select a service, such as a forwarding lithography data (S15), lithography reservation (S17), lithography condition configuration (S19), lithography monitoring (S21), and the termination process (s23), through the first user terminal 3a. In step S13, the order receiving unit 10 receives a user selected service information from the first user terminal 3a, and executes the user selected service.

(c) In step S14, the portal site server 1 determines whether or not the selected information in step S13 is forwarding of the lithography data. If it is the forwarding of the lithography data, the process proceeds to the process in step S15, and starts the lithography data forwarding process. Then, the portal site server 1 also executes the process for receiving the lithography data sent from the first user terminal 3a. If it is not the forwarding of the lithography data, the process proceeds to step S16.

(d) In step S16, the portal site server 1 determines whether or not it is the selected information received in step S13. If it is the lithography reservation, the process proceeds to step S17, a lithography reservation process is started, and the reservation process of the lithography unit is executed based on the request of the first user terminal 3a. If it is not the lithography reservation, process proceeds to step S18.

(e) In step S18, the portal site server 1 determines whether or not the selected information is the configuration of the lithography conditions. If it is the lithography condition configuration, the process proceeds to step S19, and the lithography condition configuration process of the lithography unit $5x_1$ is executed based on the request from the first user terminal 3a. If it is not the lithography condition configuration, the process proceeds to step S20.

(f) In the step S20, the portal site server 1 determines whether or not the selected information received in step S13 is the lithography monitoring or not. If it is the lithography monitoring, process proceeds to step S21, and the lithography monitoring process, where the lithography state at the lithography unit $5x_1$ is sent to the first user terminal 3a, is executed.

(g) In step S22, the portal site server 1 determines whether or not the selected information received in step S13 is the termination process. If it is the termination process, the process proceeds to step S23, and lithography data is deleted based on the first user terminal 3a. If it is not the termination process, the portal site server 1 disconnects the first user terminal 3a and ends the process.

Forwarding Lithography Data (S15)

Figure 4:
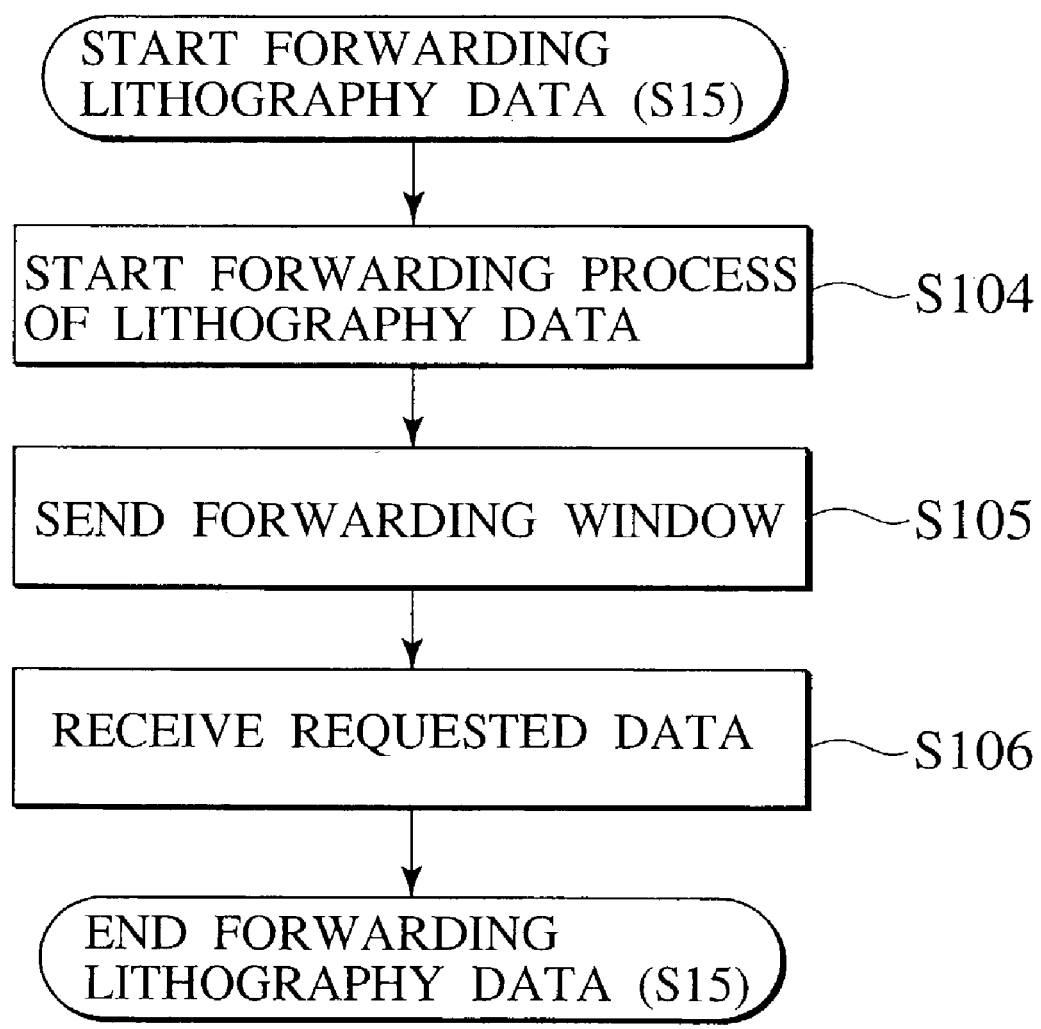
FIG. 4 is a flowchart illustrating a lithography data forwarding process shown in FIG. 3B.

As shown in FIG. 4, a process for forwarding lithography data in step S15 of FIG. 3B will be explained.

(a) When the selection information, received by the first user terminal 3a, is the "forwarding lithography data" in step S13 of FIG. 3B, the portal site server 1 starts a forwarding lithography data process in step S104 of FIG. 4.

Figure 5:
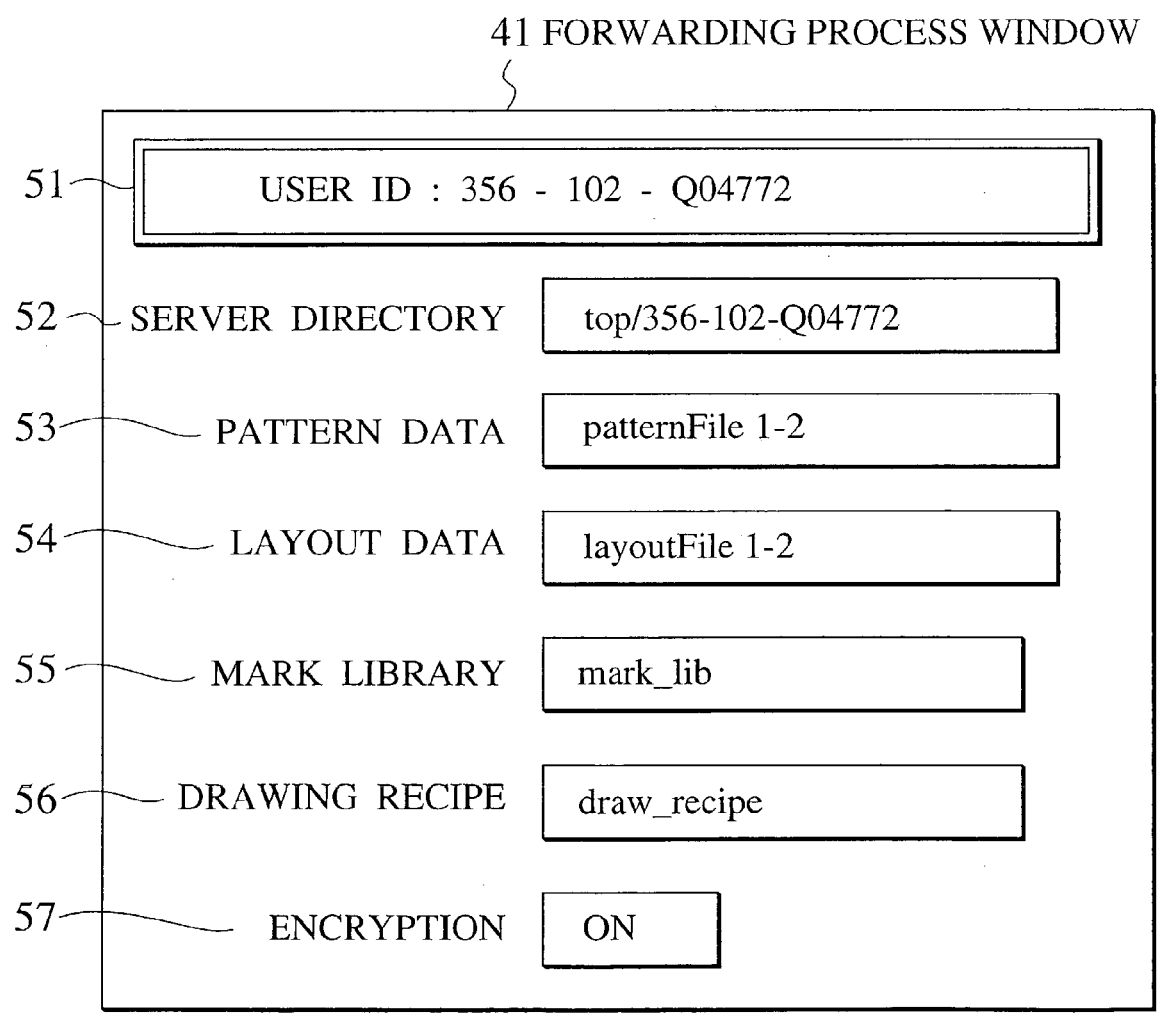
FIG. 5 is an example of the forwarding process window of the first embodiment of the present invention.

(b) In step S105, sending unit 9 sends a forwarding window 41 to the first user terminal 3a. An example of the forwarding window 41 is shown in FIG. 5. In the forwarding window 41, a user ID 51, given for each of the users, is displayed. Then, the user may specify a directory of the portal site server as a server directory 52. In the forwarding window 41 shown in FIG. 5 shows that a user directory in a top directory of the portal site server 1 is specified. The user may also specify a mask data file(s) for mask pattern in pattern data 53. In FIG. 5, two files such as a "patternFile 1" and "patternFile 2" are specified as the pattern data 53. In layout data 54, a file or files for layout data, such as a pattern layout, an alignment mark pattern and a mark position may be specified. In FIG. 5, two files such as a "layoutFile 1" and a "layoutFile 2" are selected as the layout data 54. In a mark library 55, a library for a mark or marks generally used for an alignment mark pattern and a measurement may be specified.

In a drawing recipe 56, a recipe file or recipe files, including parameters for set-up conditions and exposure conditions that the user would like to control. Then, in an encryption 57, the user may select to send the specified data whether or not encrypted.

(c) When the data (in server directory 52 through the encryption 57) are selected and sent from the first user terminals 3a to the portal site server 1, the portal site server 1 receives a requested data, including the pattern data, by using the lithography data receiving unit 11, stores in the lithography data database 31, and ends the process for forwarding lithography data.

Reservation Process (S17)

Figure 6:
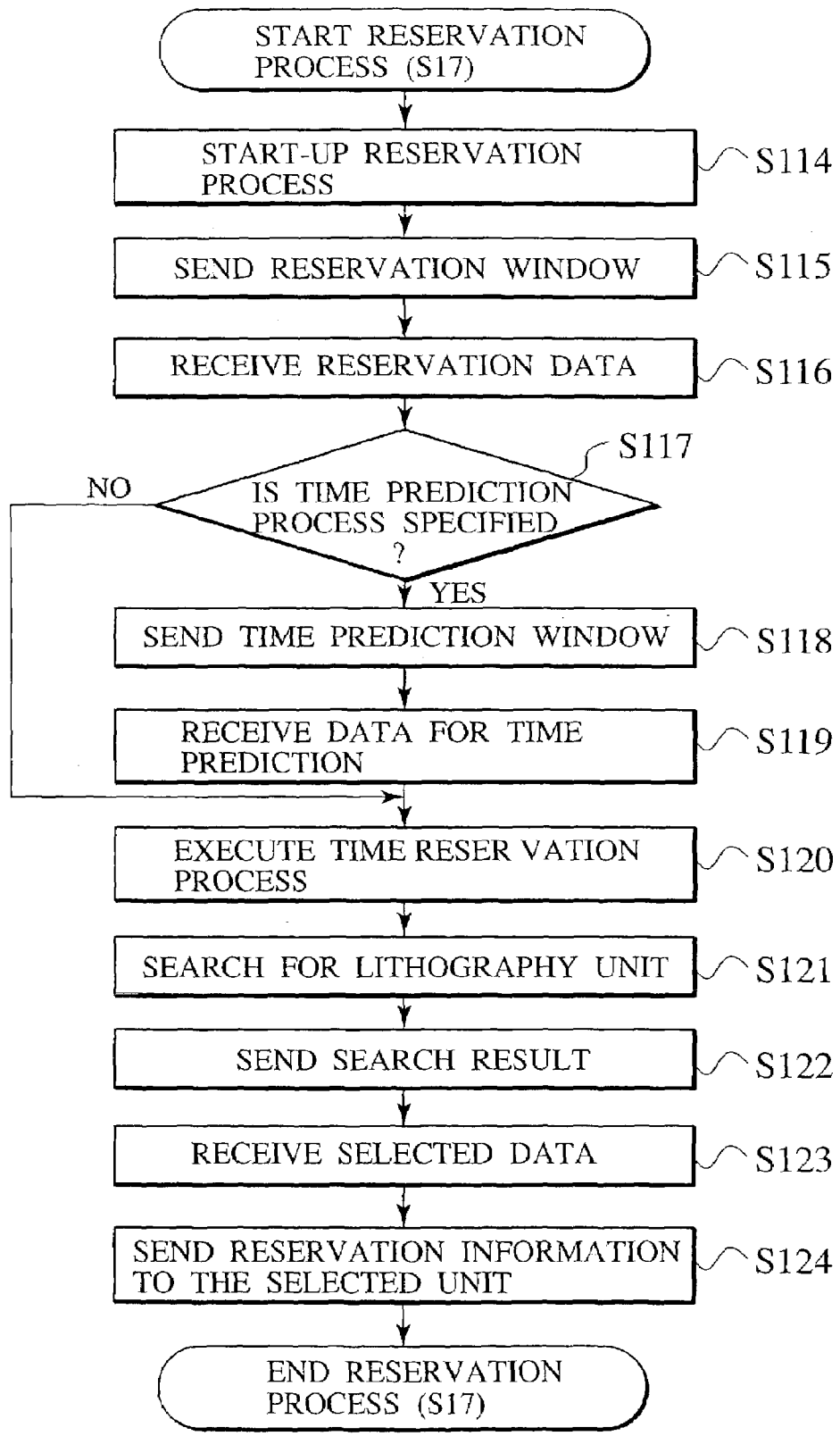
FIG. 6 is a flowchart illustrating a lithography reservation process shown in FIG. 3B.

As shown in FIG. 6, the reservation process in step S17 of FIG. 3B will be explained.

Figure 7:
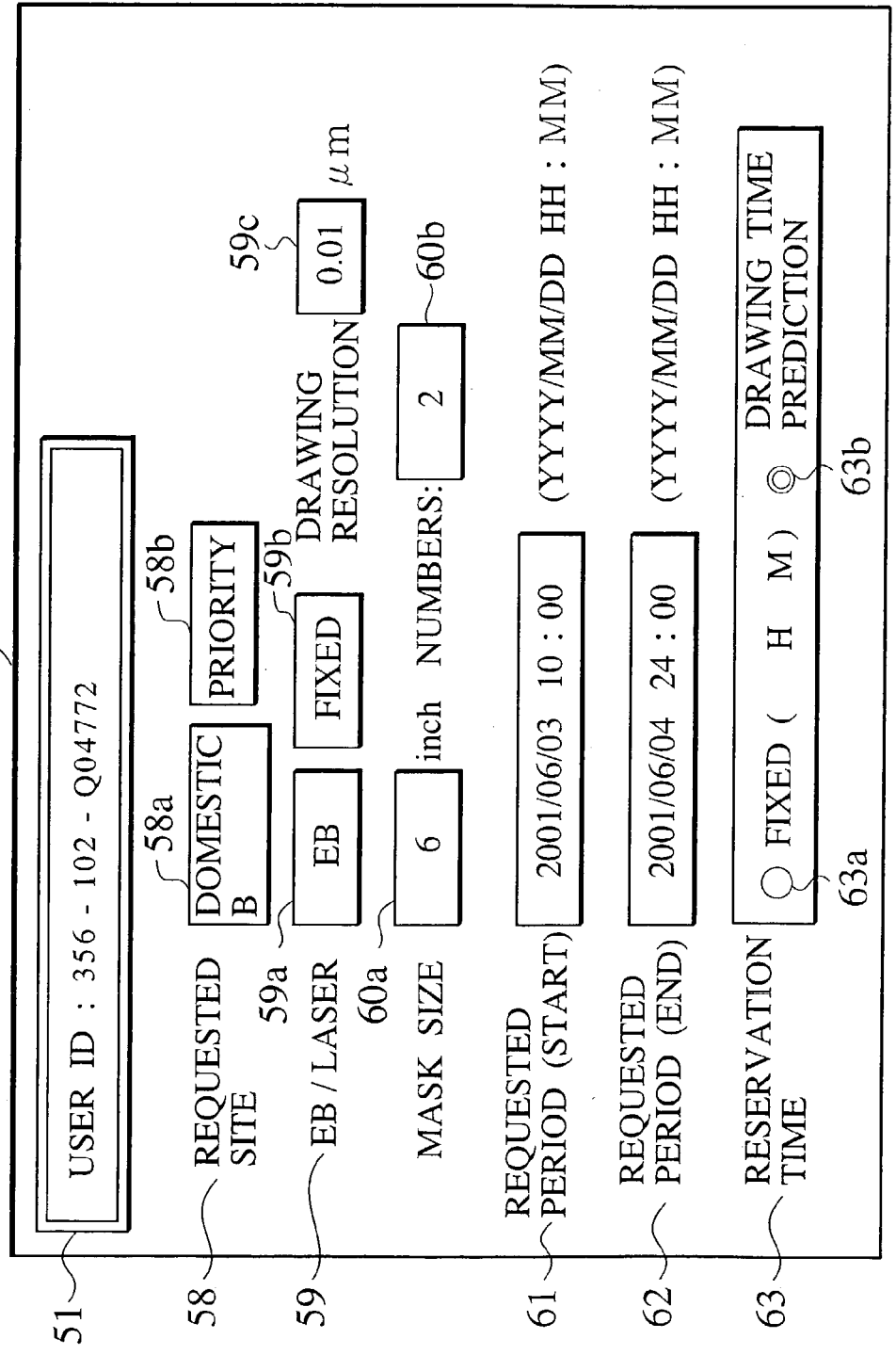
FIG. 7 is an example of the lithography unit reservation window of the first embodiment of the present invention.

(a) When "lithography reservation" is selected in step S13 of FIG. 3B, the portal site server 1 starts the reservation process in step S114 of FIG. 6. Then, in step S115, the sending unit 9 sends a reservation window 42 to the first user terminal 3a. An example of the reservation window 42 is shown in FIG. 7. First, in the reservation window 42, a user ID 51 is displayed. Then, at a requested site 58, the user may specify and request a site, where the lithography units are connected. In addition, at an item 58b, the user may also specify "priority" which has some flexibility or "fixed" which does not have any flexibility. In FIG. 7, a site called "Domestic B" is selected and listed as a site name 58a, and in the item 58b, "priority" is specified. Therefore, in the example shown in FIG. 7, a domestic site B is specified to be selected as prioritized. Although it is not shown in FIG. 7, an item to select a lithography unit may be possibly placed in the reservation window 42.

(b) As a lithography type (electron beam (EB)/laser) 59, an electron beam (EB) exposure or a laser exposure may be selected at an item 59a. Then, in an item 59b "priority" or "fixed" may also be selected. In addition, a wavelength for the laser may be indirectly selected at a drawing resolution 59c. A size and number of masks may also be specified in the reservation window 42. A mask size maybe typed in inches at an item 60a, and numbers of masks may also be typed in at an item 60b. Then, the user may specify a requested start time 61 and a requested end time 62, and the user may set up a reservation time 63. As the reservation time 63, fixed time in an item 63a may be set up, but the user may set up a drawing time prediction process at an item 63b to predict a lithography time and use this predicted time as the reservation time.

(c) When all of the items in the reservation window 42 are filled up, a reservation data is sent from the first user terminal 3a to the portal site server 1, and the portal site server 1 receives the reservation data in a step S116 of FIG. 6.

Figure 8:
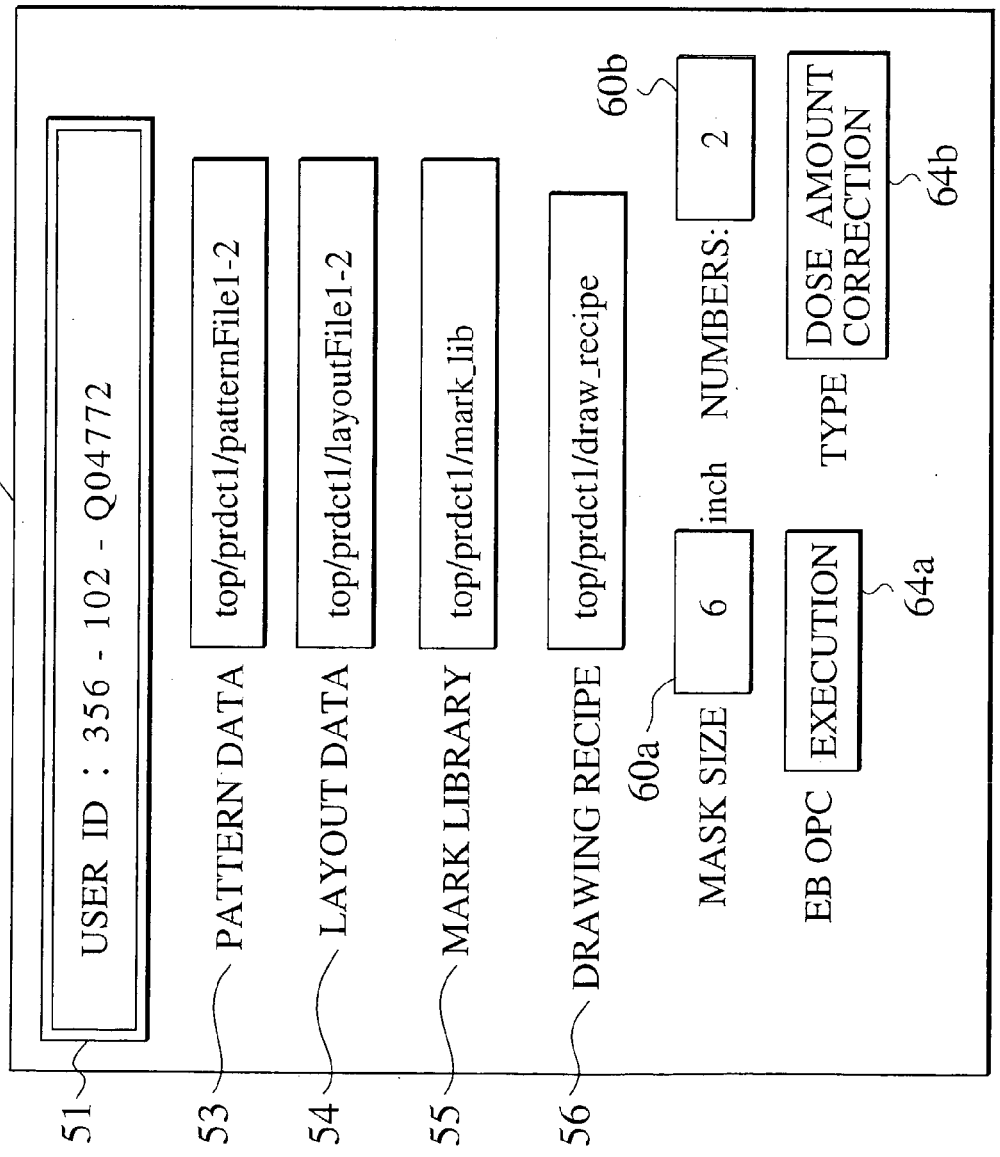
FIG. 8 is an example of the time prediction process window of the first embodiment of the present invention.

(d) Then, in step S117, the portal site server 1 determines whether or not an item 63b, the drawing time prediction, is selected. If the drawing time prediction is not selected, process proceeds to step S120. If the drawing time prediction is selected, the sending unit 9 sends a time prediction process window 43 to the first user terminal 3a in step S118. The time prediction process window 43 is shown in FIG. 8. As shown in FIG. 8, in the time prediction process window 43, the user ID 51 is displayed first, as other windows explained above do. Then, items, such as the pattern data 53, the layout data 54, the mark library 55, the drawing recipe 56, mask size 60a, and mask numbers 60b are displayed. In an item 64a, the user may select whether or not to execute an EB proximity effect correction, and the user may also select a type in an item 64b when the user selects to execute EB proximity effect correction. In an example shown in FIG. 8, the user selects to execute the EB proximity effect correction, and its type is a dose amount correction. When the user fills up all of the information, the first user terminal 3a sends data for the time prediction to the portal site server 1.

(e) In step S119, the portal site server 1 receives the data for the time prediction from the first user terminal 3a. Then, in step S120, the lithography time prediction unit 12 executes the lithography reservation process. In step S121, the lithography unit searching unit 13 searches for at least a lithography unit $5x_1$ as a candidate lithography unit.

(f) In step S122, the portal site server 1 sends a search result display window 44, which includes a list of searched result in step S120, to the first user terminal 3a. An example of the search result display window 44 is shown in FIG. 9. As shown in FIG. 9, the user ID 51 is displayed in the search result display window 44. Further, the search result display window 44 shows a list including a site name 65a, a unit name 65b, a type name 65c, a resolution 65d, a starting time 65e, a predicted time 65f, a lithography price 65g for each of the lithography units that match to the conditions given by the user. Then, the user selects one lithography unit, such as the lithography unit $5x_1$. Then, the user reserves the lithography unit $5x_1$ as a candidate by selecting a reservation number 66 in the search result display window 44 at the first user terminal 3a. In FIG. 9, the user select "1" for the reservation number 66. It means that the user select the first lithography unit shown in the search result display window 44. Corresponding to this user's action, the portal site server 1 receives the selected data from the first user terminal 3a in step S123.

(g) In step S124, the lithography unit reservation unit 14 sends reservation information to the lithography unit $5x_1$, which is selected by the user, and the portal site server 1 ends the reservation process (S17).

Configuration Process (S19)

Figure 10:
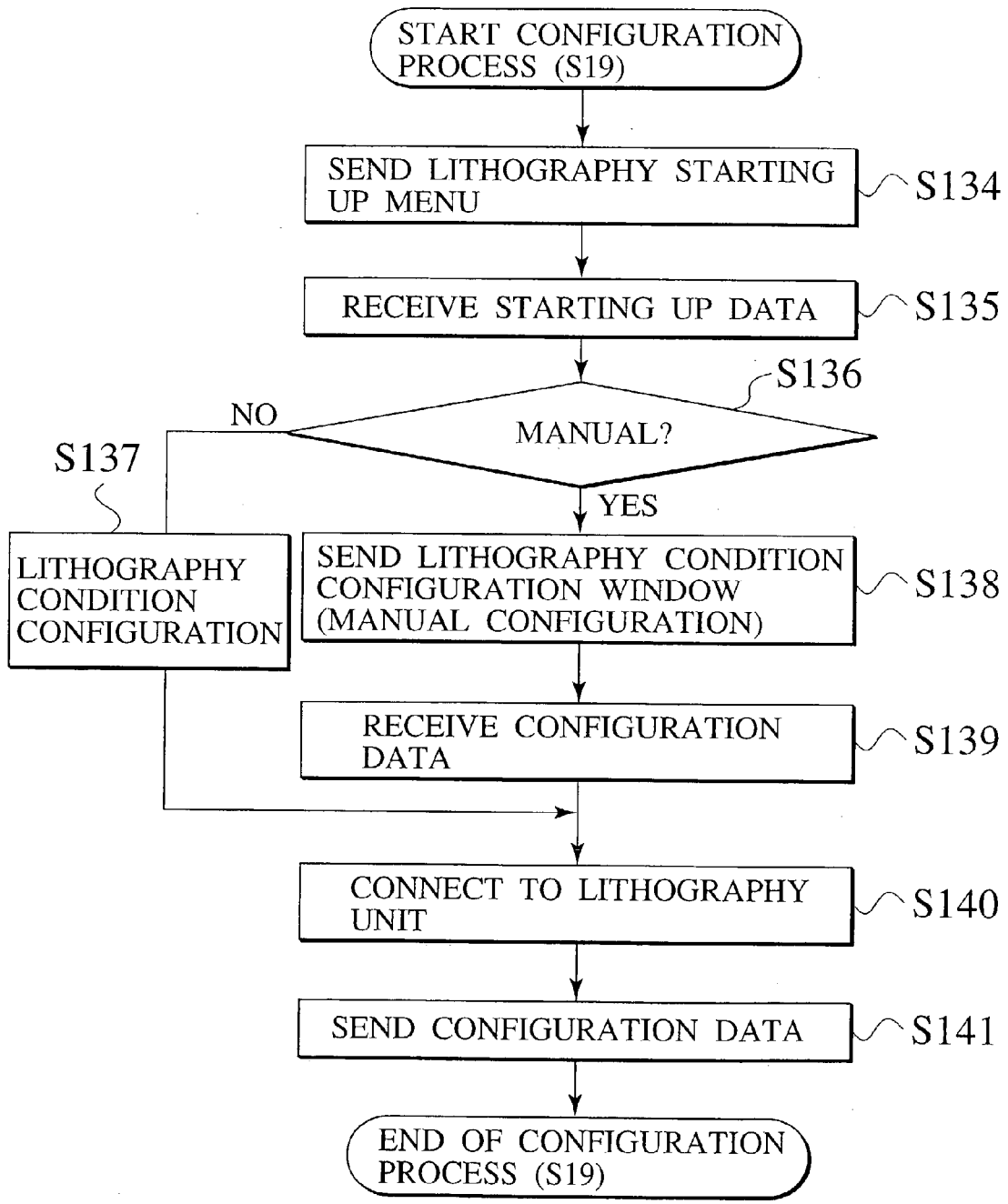
FIG. 10 is a flowchart illustrating a configuration process shown in FIG. 3B.

As shown in FIG. 10, the lithography condition configuration process in step S19 of FIG. 3B will be explained.

Figure 11:
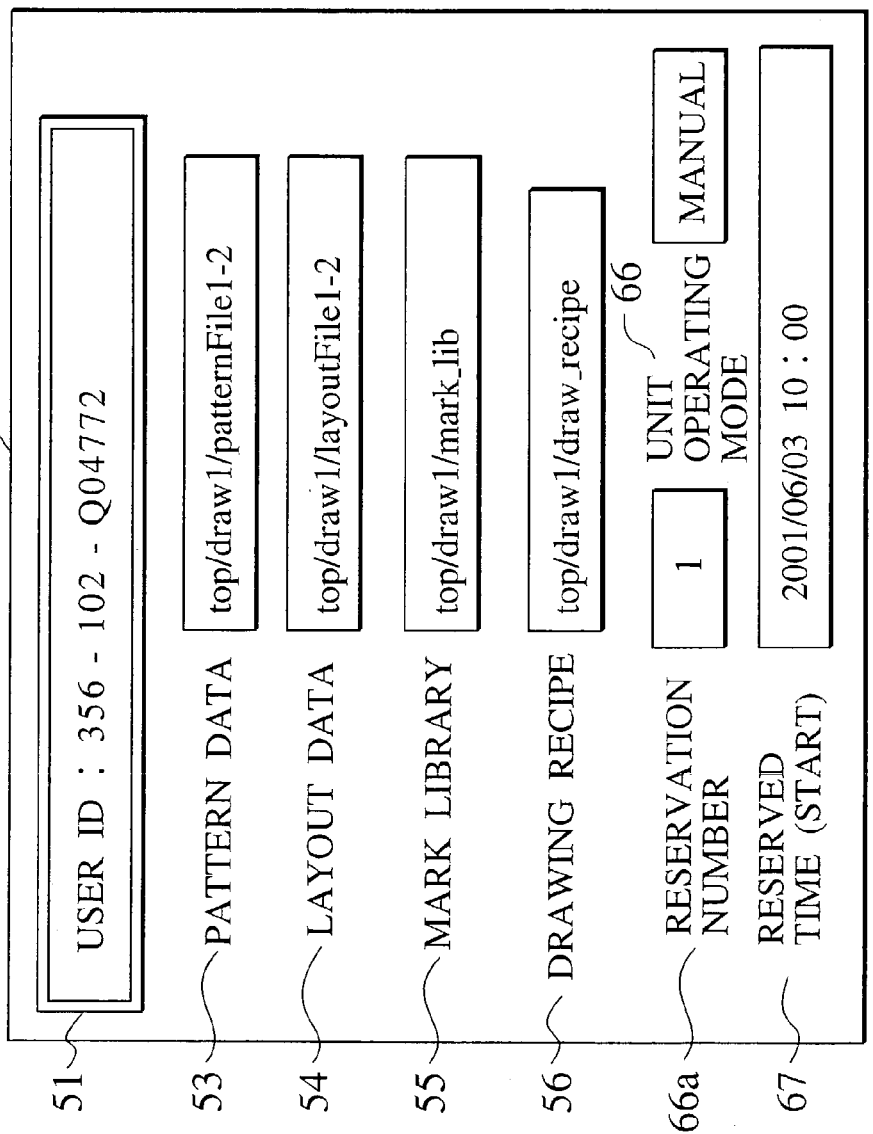
FIG. 11 is an example of the lithography starting up menu of the first embodiment of the present invention.

(a) When the "configuration process (S19)" is selected by the user, the portal site server 1 sends a lithography starting up menu 45 to the first user terminal 3a in step S134 of FIG. 10. In the lithography starting up menu 45, as shown in FIG. 11, the user ID 51 is displayed. The user may use the first terminal 3a to select or input information, such as a pattern data 53, a layout data 54, a mark library 55, a drawing recipe 56, a reservation number 66a, a unit operation mode 60b, and a reservation time (start time) 67. In FIG. 11, "patternFile 1" and "patternFile 2" stored in a directory, called "draw 1" in "top" are selected as the pattern data 53. As the layout data 54, "layoutFile 1" and "layoutFile 2" in the "draw 1" are selected. As the mark library 55, "mark_lib" in the "draw 1" is selected. As the drawing recipe 56, "draw_recipe" in the "draw 1" is selected. The reservation number 66a is "1", and the unit operating mode 60b is set up to the "manual" mode. Then, the reserved (start) time 67 is set up at "10 am on Jun. 3, 2001" in FIG. 11.

(c) In step S135, the portal site server 1 receives the starting up data, which the user input to the lithography starting up menu 45, from the user terminal 3a. Then, in step S136, the portal site server 1 certifies if the unit operating mode 60b is selected "manual" or "automatic" for specifying whether or not a "prior operation" is selected. If the unit operating mode 60b is in a "manual" mode, the "prior operation" is selected, and the portal site server 1 sends a lithography condition configuration window to the first user terminal 3a in step S138. Then, in step S139, the portal site server 1 receives a configuration data from the first user terminal 3a. If the unit operating mode 60b is in an "automatic" mode, the "prior operation" is not selected, so the process proceeds to a process in step S137, and the portal site server 1 configures the lithography condition. Then, the process proceeds to a process in Step S140.

(d) In step S140, the portal site server 1 connects to the lithography unit $5x_1$, selected by the user. Then, in step S141, the portal site server 1 sends the configuration data, manually or automatically configured, to the lithography unit $5x_1$. The lithography unit $5x_1$ receives the configuration data and starts the lithography process at the reserved time based on the configuration data. During the lithography process, the portal site server 1 receives lithography progress reports from the lithography unit $5x_1$.

Monitoring Process (S21)

Figure 12:
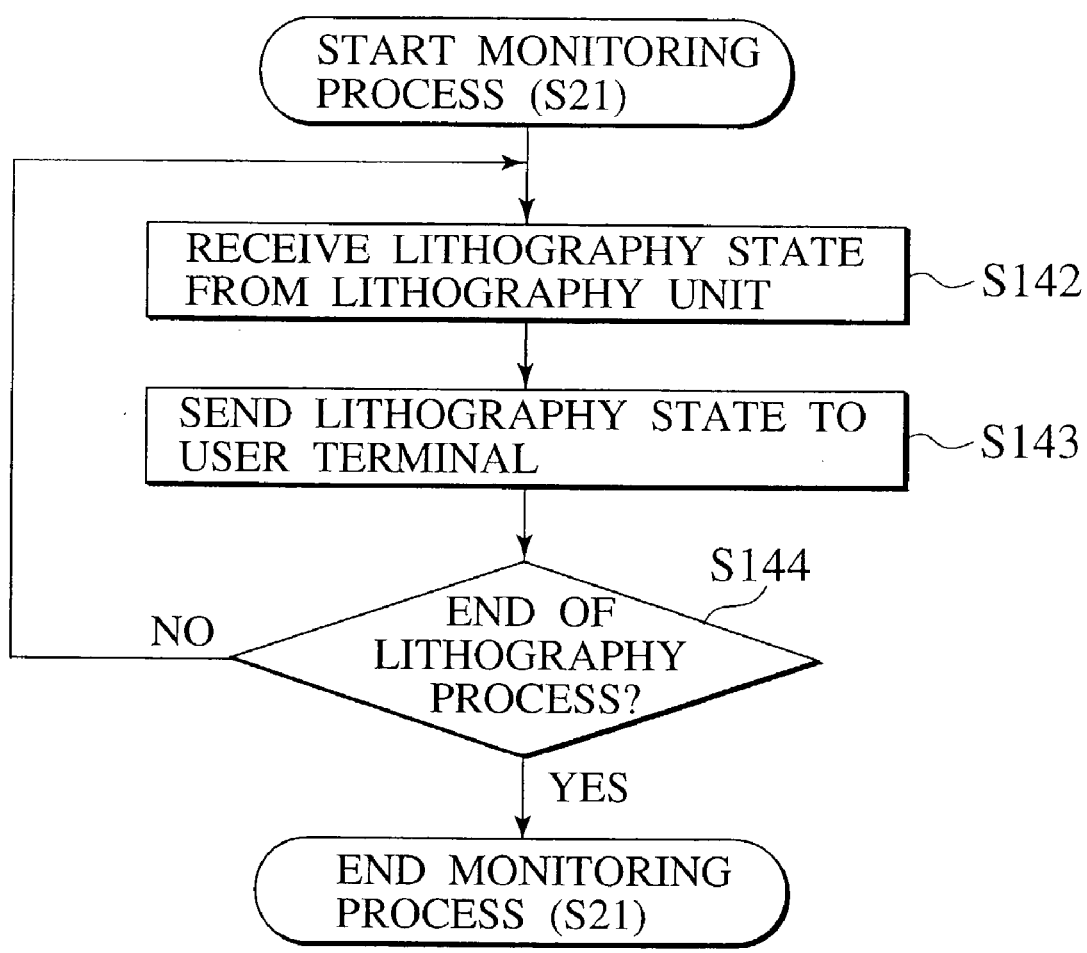
FIG. 12 is a flowchart illustrating the monitoring process shown in FIG. 3B.

As shown in FIG. 12, the lithography monitoring process in step S21 of FIG. 3B will be explained.

Figure 13:
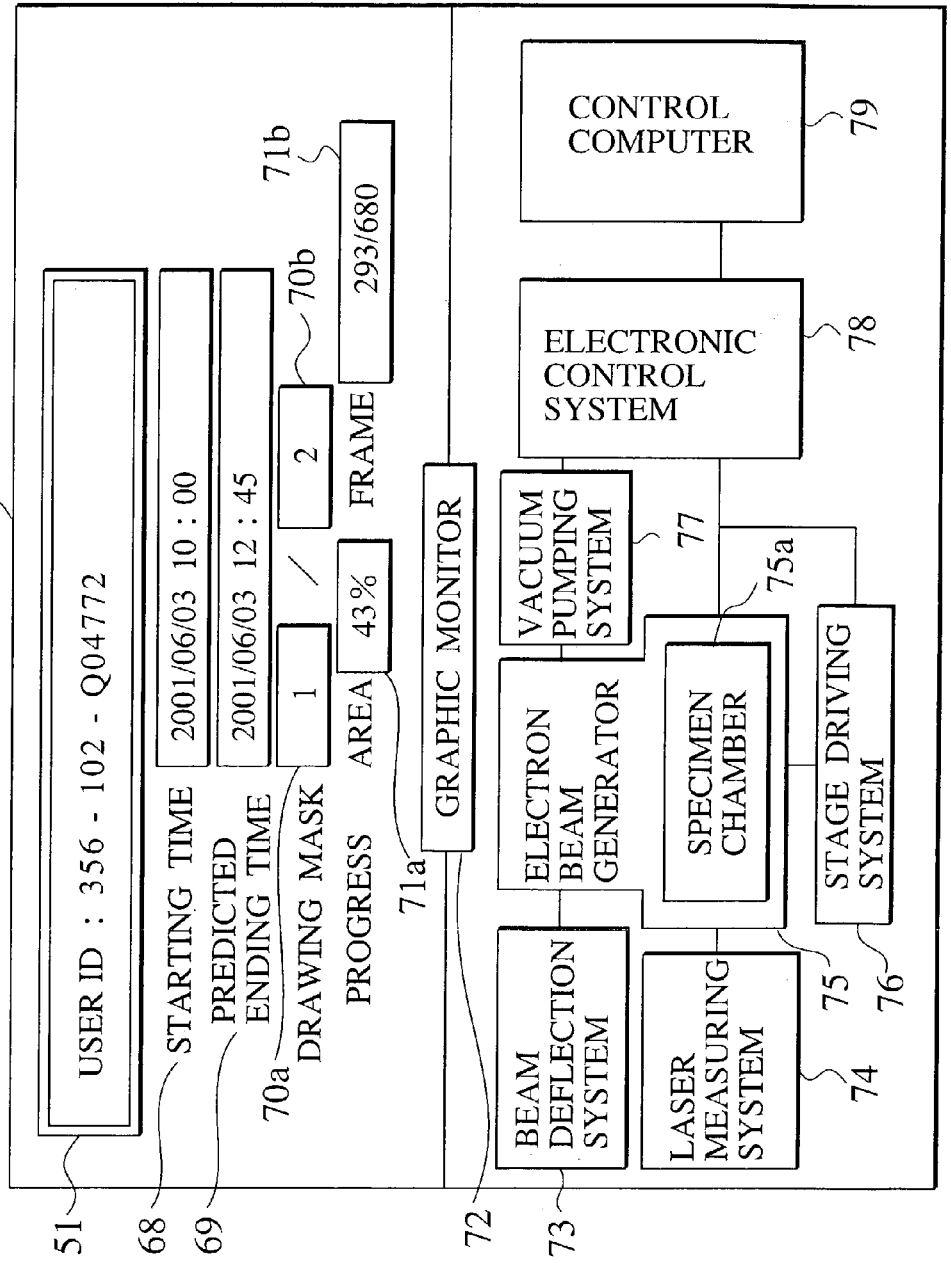
FIG. 13 is an example of the lithography state monitoring window of the first embodiment of the present invention.

(a) In step S142 shown in FIG. 12, the lithography monitoring unit 16 receives the lithography progress reports from the lithography unit $5x_1$. Then, in step S143, the lithography monitoring unit 16 sends the lithography progress reports to the first user terminal 3a within a lithography state monitoring window 46, shown in FIG. 13. In the lithography state monitoring window 46, the user may figure out which mask is in which process, or how far the process goes on at the present time. In this lithography state monitoring window 46, the user ID 51, a starting time 68, a predicted ending time 69, an item 70a to show which mask is on the process, an ordered mask number 70b, an item 71a showing a progress statement within a proportion of a lithography area (an item illustrating a progress state of the mask lithography in a proportion of a lithography area), an item 71b showing a progress statement within a frame number, and a graphic monitor 72 are displayed. In the graphic monitor 72, the lithography process is divided into a plural number of processes or variety. Therefore, the user may easily understand how far the process goes. In the graphic monitor 72, shown in FIG. 13, the lithography process is divided into eight control systems, such as a beam-deflection system 73, a laser measuring system 74, an electron beam generator 75, a specimen chamber 75a, a stage driving system 76, a vacuum pumping system 77, an electronic control system 78 and a control computer 79. When all of the ordered masks go on the process and the mask drawing ends, the process proceeds to a process in step S144.

(b) In step S144, the portal site server 1 determines whether or not the lithography process ends. If the lithography process does not end, the process goes back to a process in step S142 and continues to receive the lithography state from the lithography unit $5x_1$. If the lithography process ends, the configuration data, sent to the lithography unit $5x_1$ as ordered information, is deleted. However, the portal site server 1 still has the configuration data. Therefore, the lithography unit $5x_1$ may receive the configuration data when something happens and the lithography unit $5x_1$ needs deleted data. Therefore, in order to cope with a security problem, all of the data, sent from the first user terminal 3a and temporally stored in the lithography unit $5x_1$, is completely deleted.

Termination Process (S23)

Figure 14:
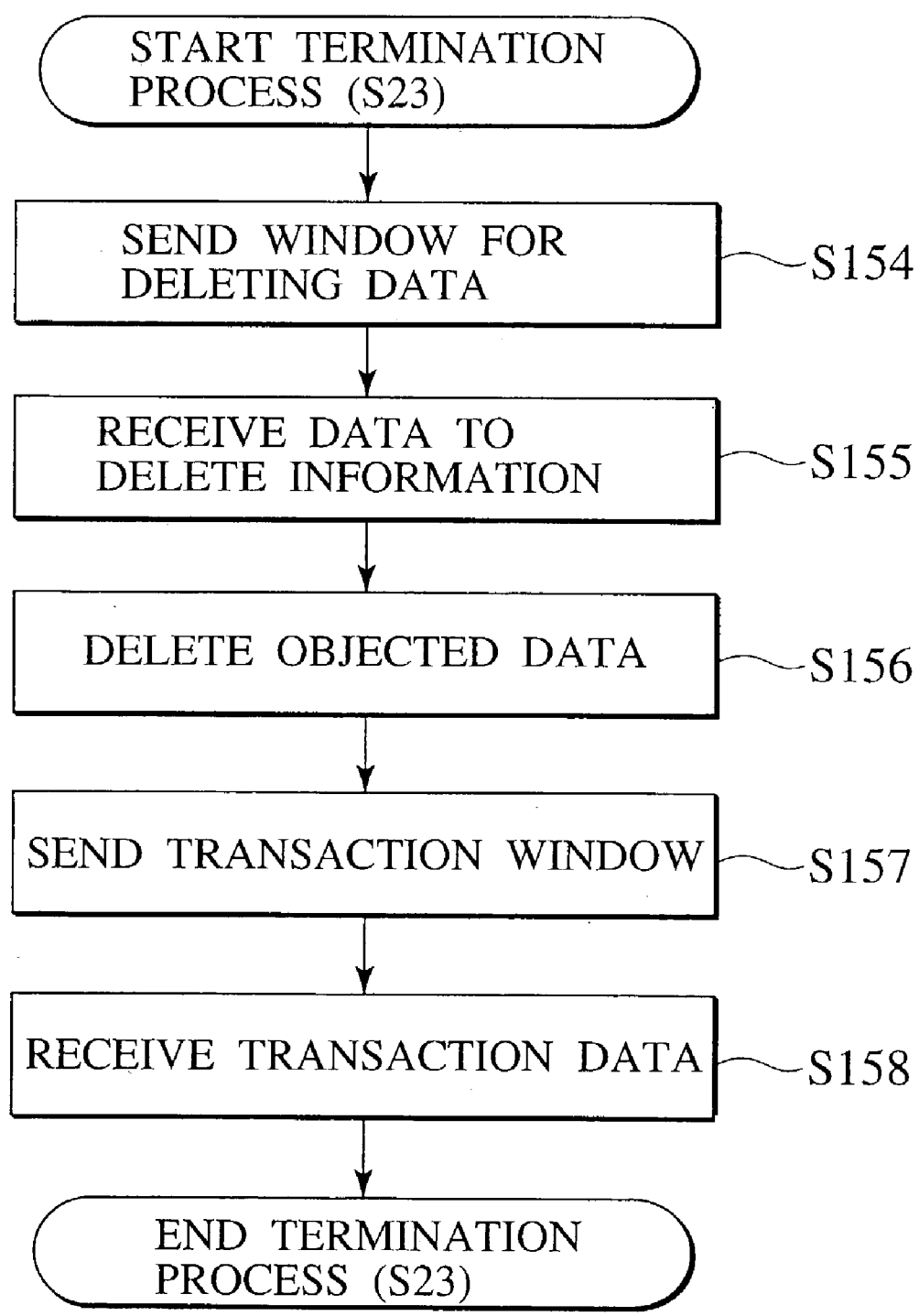
FIG. 14 is a flowchart illustrating the termination process shown in FIG. 3B.

As shown in FIG. 14, the termination process in step S23 of FIG. 3B will be explained.

(a) First, when the "termination process" in step S13 FIG. 3B is selected, the sending unit 9 sends a deleting data window to the first user terminal 3a in step S154 of FIG. 14. The user may select data to delete and input information about the deleting data on the deleting data window. Then, the portal site server 1 receives the information about the deleting data from the first user terminal 3a.

(b) In step S156, the lithography data deleting unit 17 destroys the deleting data based on received information about the deleting data from the first user terminal 3a. This deleting data is data stored in the portal site server 1 and sent to the lithography unit $5x_1$, which the user selected. The data sent and stored in the lithography unit $5x_1$ is destroyed when the lithography process is done at the lithography unit $5x_1$.

Figure 15:
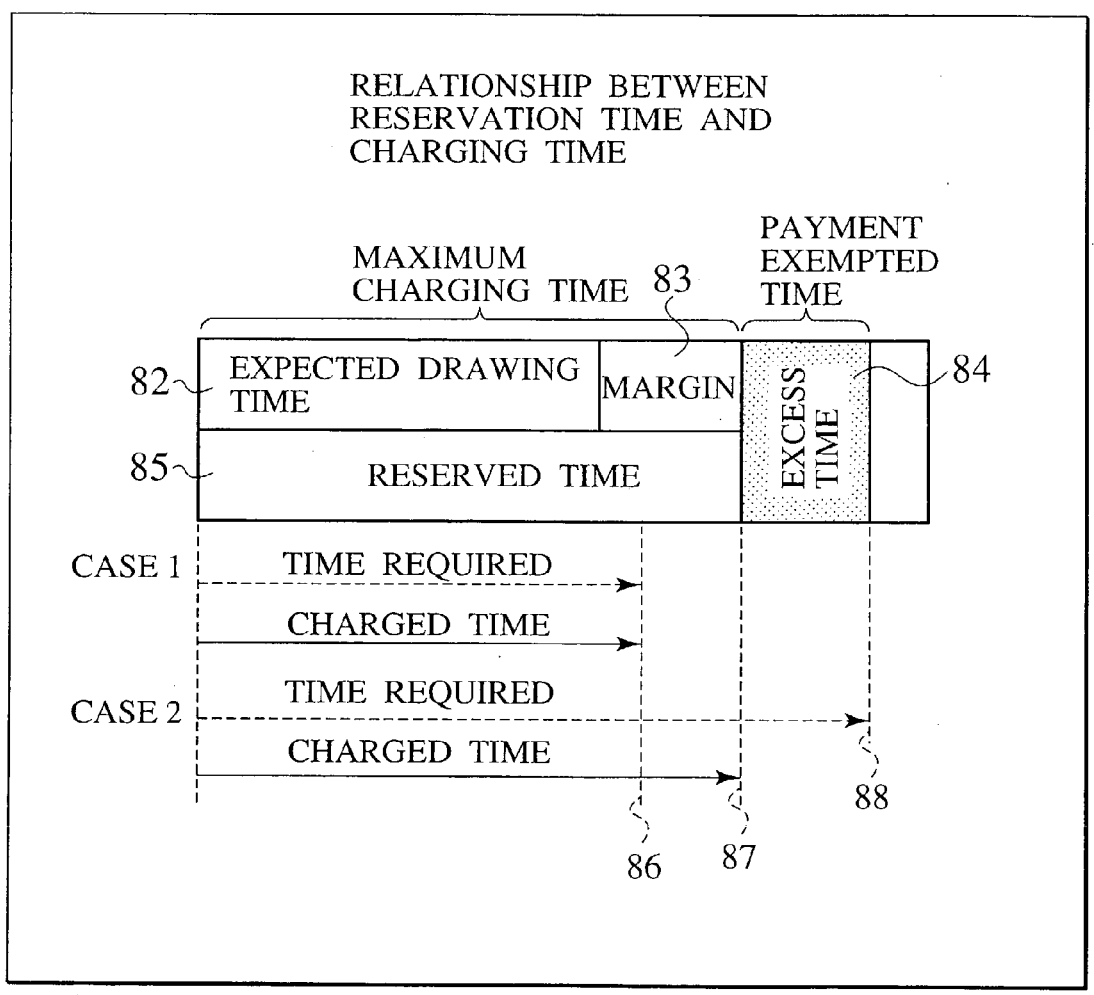
FIG. 15 is a chart illustrating a relationship between the reservation time and the charging time according to the first embodiment of the present invention.

(c) When the deleting process of data is ended, the lithography charging unit 18 sends a transaction window to the first user terminal 3a and charges the user for use of the lithography unit $5x1$. The user is generally charged to an actual time that the lithography unit $5x_1$ is in use. For example, as shown in FIG. 15, when the lithography reservation is made, a reserved time 85 is calculated by adding a margin time 83 to an expected drawing time 82. Then, after this drawing, only an actual time, that the lithography unit $5x_1$ is in use, is charged. For instance, a case 1 in FIG. 15 shows that time up to an ending time 86 is going to be charged. A case 2 shows that an excess time 84 is going to be exempted when the reserved time is exceeded. In other words, in the case 2, although the time required includes the expected drawing time 82, margin 83, and the excess time 84 in FIG. 15, a maximum charging time is only the reserved time and the excess time 84, which is a payment exempted time, is exempted. When the time prediction process is in use, the excess time 84 is exempted from charging time for reducing inaccuracy of the time prediction.

(d) In step S158, the portal site server 1 receives a transaction data from the first user terminal 3a and ends the termination process of step S23 in FIG. 3B.

The function of the LSI mask manufacturing system and method of the first embodiment of the present invention may be programmed and saved in a computer-readable recording medium. For the LSI mask manufacturing method of the first embodiment of the present invention, the programs saved in the recording medium is transferred to a memory in a computer system and then operated by its operating unit, thus putting the method in practice. The recording medium may be selected from semiconductor memories, magnetic disks, optical disks, optomagnetic disks, magnetic tapes, and any of the computer-readable recording mediums.

The LSI mask manufacturing system, method and program according to the first embodiment of the present invention provides a system, a method and a program that a user can select and control the schedules and the lithography units. In addition, the LSI mask manufacturing system, method and program according to the first embodiment of the present invention also provides a system, a method and a program that is able to manufacture masks without leaking confidential information, related to lithography data and process conditions for mask manufacturing, to a third person. Furthermore, the LSI mask manufacturing system, method and program according to the first embodiment of the present invention also provides a system, a method and a program that is able to reduce the personnel expenses to provide the LSI mask manufacturing system, method and program by introducing an online ordering system. In addition, the LSI mask manufacturing system, method and program according to the first embodiment of the present invention may also provides a system, a method and a program that is able to reduce costs for mask manufacturing since the user does not have to own units, low in the rate of operation, for a special use or for applying high technologies. The user may share these special units with other users by using the LSI mask manufacturing system, method and program according to the first embodiment of the present invention. In addition, the LSI mask manufacturing system, method and program according to the first embodiment of the present invention may also provides a system, a method and a program to a wide range of users from small business users to major users (large business users).

SECOND EMBODIMENT

Figure 16:
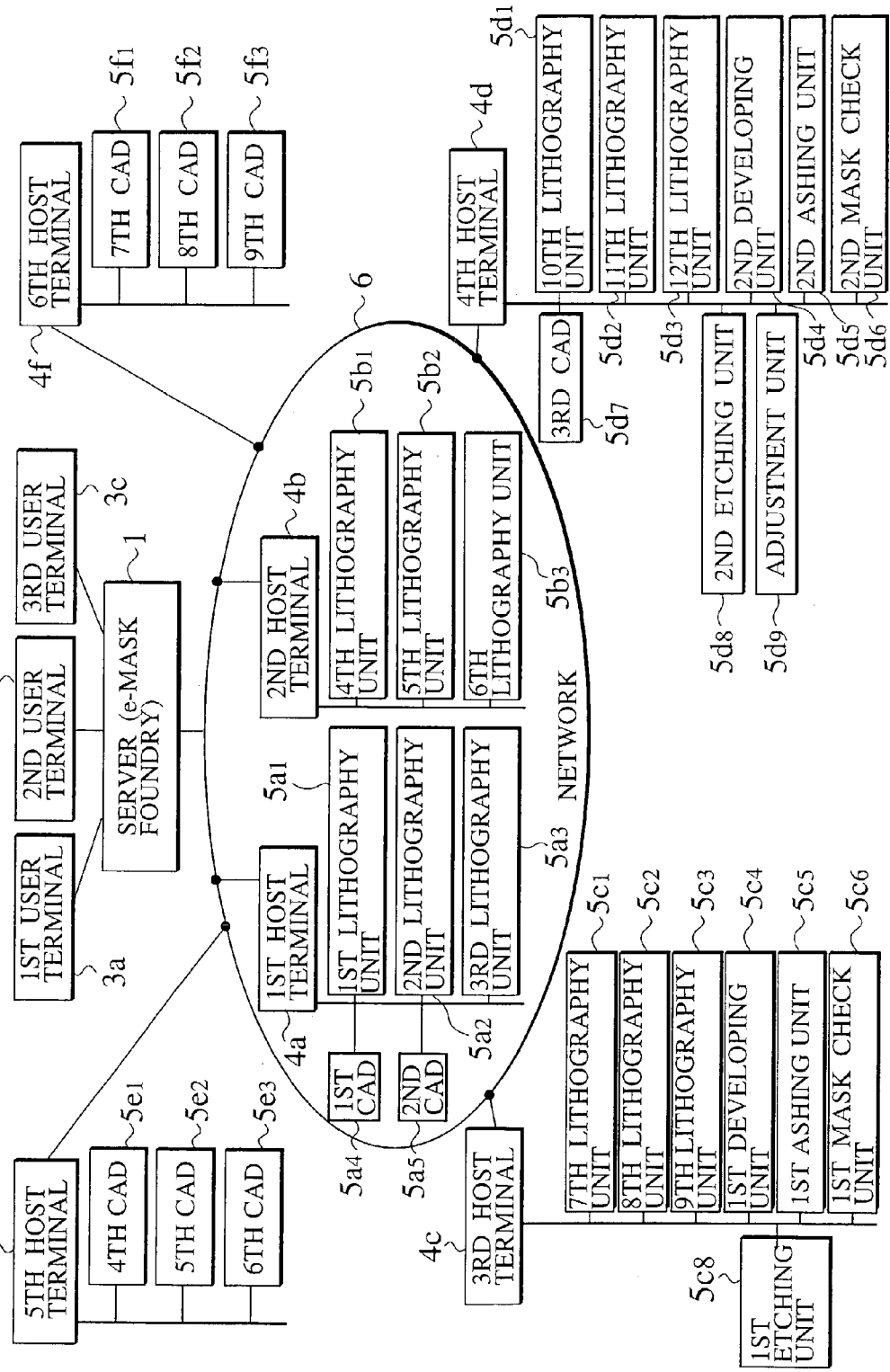
FIG. 16 is a conceptual diagram illustrating the mask manufacturing system according to the second embodiment of the present invention.

As shown in FIG. 16, an LSI mask manufacturing system according to the second embodiment of the present invention includes a portal site server 1, a first user terminal 3a, a second user terminal 3b, a third user terminal 3c, a first host terminal 4a having a first lithography unit $5a_1$, a second lithography unit $5a_2$, a third lithography unit $5a_3$, a first computer-aided design unit (CAD) $5a_4$ and a second CAD $5a_5$, a second host terminal 4b having a fourth lithography unit $5b_1$, a fifth lithography unit $5b_2$ and a sixth lithography unit $5b_3$, a third host terminal 4c having a seventh lithography unit $5c_1$, an eighth lithography unit $5c_2$, a ninth lithography unit $5c_3$, a first developing unit $5c_4$, a first ashing unit $5c_5$, a first mask check unit $5c_6$ and a first etching unit $5c_8$, a fourth host terminal 4d having a tenth lithography unit $5d_1$, an eleventh lithography unit $5d_2$ and a twelfth lithography unit $5d_3$, a second developing unit $5d_4$, a second ashing unit $5d_5$, a second mask check unit $5d_6$, a third CAD $5d_7$, a second etching unit $5d_8$ and an adjustment unit $5d_9$, a fifth host terminal 4e having a fourth CAD 5e, a fifth CAD $5e_2$ and a sixth CAD $5e_3$, a sixth host terminal 4f having a seventh CAD $5f_1$, a eighth CAD $5f_2$ and a ninth CAD $5f_3$, and a network 6 connecting the portal site server 1, the user terminals 3a–3c, and the host terminals 4a–4f.

In the second embodiment of the present invention, Internet is proposed as one example of network 6. However, other networks such as LAN or a personal computer communication network are alternatives and preferable. In addition, all of the first host terminal 4a, the second host terminal 4b, the third host terminal 4c, the fourth host terminal 4d, the fifth host terminal 4e and the sixth host terminal 4f may be connected to network 6 in one country or in a plural countries. For example, it is possible to do that the first host terminal 4a and the second host terminal 4b are connected to network 6 in Japan, the third host terminal 4c is connected to network 6 in the U.S.A., and the fourth host terminal 4d may be connected to network 6 in Germany.

Figure 17:
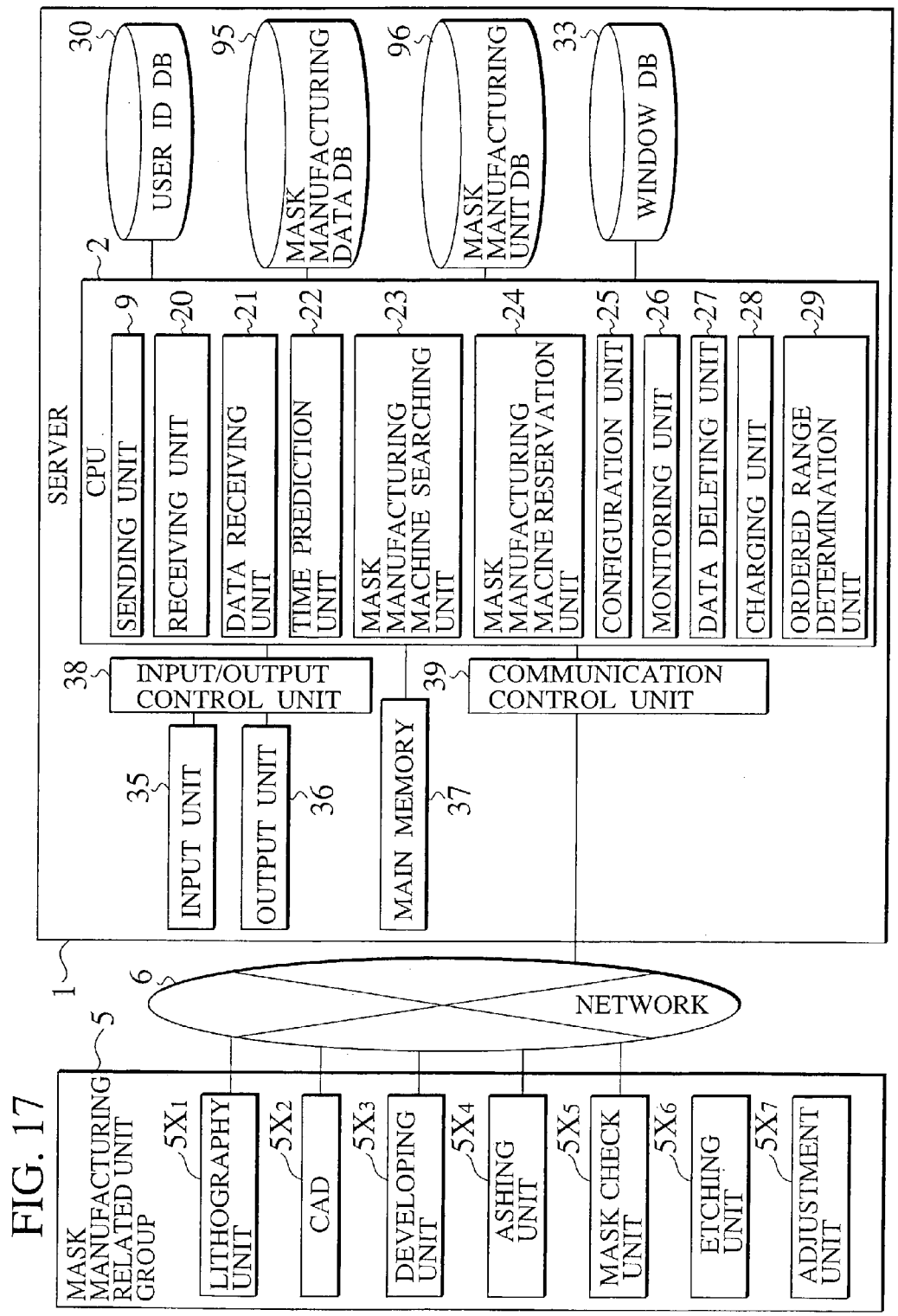
FIG. 17 is a block diagram illustrating the mask manufacturing system shown in FIG. 16.

As shown in FIG. 16 and FIG. 17, the LSI mask manufacturing system in the second embodiment of the present invention has many structures that the LSI mask manufacturing system in the first embodiment of the present invention shown in FIG. 1 and FIG. 2. Therefore, only the different structures of the LSI mask manufacturing system in the second embodiment of the present invention will be explained. As shown in FIG. 17, the portal site server 1 in the second embodiment of the present invention is different from the portal site server 1 in the first embodiment shown in FIG. 2 since the portal site server 1 in the second embodiment of the present invention has a central processing unit (CPU) 2 including a sending unit 9, a data receiving unit 21, a time prediction unit 22, a mask manufacturing machine searching unit 23, a mask manufacturing machine reservation unit, a configuration unit 25, a monitoring unit 26, a data deletion unit 27, a charging unit 28 and an ordered range determination unit 29. In addition, the portal site server 1 of the second embodiment of the present invention includes a mask manufacturing data database 95 and a mask manufacturing unit database 96 as well as an ID database 30 and a window database 33. Further more, the portal site server 1 of the second embodiment of the present invention is connected to a mask manufacturing related unit group 5 through a network 6. The mask manufacturing related unit group 5 has a CAD $5x_2$ which generate drawing data for masks from design data, a lithography unit $5x_1$ which draws a mask based on a drawing data, a developing unit $5x_3$ which develops resist patterns, an ashing unit $5x_4$ an etching unit $5x_6$ which etches a resist which is a film shielded by chrome or chromic oxide as an etching mask, an ashing unit $5x_4$ which ashes the etched resist, a mask check unit $5x_5$ which detects for errors on the mask pattern, and an adjustment unit $5x_7$ which adjusts the mask pattern. Then the mask manufacturing related unit group may be a machine having one of the above functions or a plural numbers of the above functions. For instance, the mask manufacturing related unit group may include only the lithography unit $5x_1$, or the mask manufacturing related unit group may include the CAD $5x_2$, the lithography unit $5x_1$, the developing unit $5x_3$, the ashing unit $5x_4$, the mask check unit $5x_5$, the etching unit $5x_6$ and the adjustment unit $5x_7$. Further more, the CAD $5x2$ may be a CAD system having various functions such as correcting optic proximity effect, converting data and generating mask layouts.

The receiving unit 20 receives a mask manufacturing request from the user terminals $3a$–$3c$. The data receiving unit 21 receives data and a reservation information from the user terminals $3a$–$3c$. The time prediction unit 22 estimates the time required for an ordered process, which is a mask manufacturing. For instance, the time prediction unit 22 estimates design time required at the CAD $5x_2$ and lithography time at the lithography unit $5x_1$. The mask manufacturing machine searching unit 23 searches for the most suitable machines based on the reservation conditions received from the user terminals $3a$–$3c$, create a list of the possible selection of the machines, and sends the list to the user terminals $3a$–$3c$. For example, if the user select the processes up to the developing process, the mask manufacturing machine searching unit 23 searches for lithography units, CADs and developing units which satisfy the ordered conditions, create a list and sends the list to the user terminals $3a$–$3c$.

The mask manufacturing machine reservation unit 24 reserves at least one of the mask manufacturing units based on the request from the first through the third user terminals $3a$–$3c$. For instance, when the user specifies the fifth CAD $5e_2$, the fourth lithography unit $5b_1$, the second developing unit $5d_4$, the second ashing unit $5d_3$ and the second mask check unit $5d_6$, the mask manufacturing machine reservation unit 24 reserves the fifth CAD $5e_2$, the fourth lithography unit $5b_1$, the second developing unit $5d_4$, the second ashing unit $5d_3$ and the second mask check unit $5d_6$ for each processes. The user does not need to select machines or units from the same host terminal. The user may select machines or units from a plural number of host terminals. In addition, all of the first host terminal $4a$ through the sixth host terminal $4f$ may not be connected to the network 6 in a domestic level, but in an international level.

The configuration unit 25 configures detailed conditions at each of the units specified by the user. For instance, the user may specify the first CAD $5a_4$ and the first lithography unit $5a_1$, and the configuration unit 25 configures detailed conditions at each of the first CAD $5a_4$ and the first lithography unit $5a_1$. The monitoring unit 26 receives progress reports from each of the units and sends the progress reports to the user terminals $3a$–$3c$. For example, if the user selects the first CAD $5a_4$ and the first lithography unit $5a_1$, the monitoring unit 26 receives progress reports from the first CAD $5a_4$ and sends the progress reports to the user terminals $3a$–$3c$ first. When the design process is finished at the first CAD $5a_4$, the monitoring unit 26 receives progress reports from the first lithography unit $5a_1$ and sends the progress reports to the user terminals $3a$–$3c$.

The data deleting unit 27 receives the deleting data from the user terminals $3a$–$3c$ based on the request, and deletes the data sent and stored at each of the specified machines and units. The charging unit 28 charges to the user terminals $3a$–$3c$ based on an actual time the machines and units are used. Then, the collected charges are paid to owners of the each machines and units. The ordered range determination unit 29 determines the ordered range based on received reservation information from the user terminals $3a$–$3c$.

The mask manufacturing data database 95 is connected to the portal site server 1 and stores data needed for mask manufacturing. The "data needed for mask manufacturing" may be data needed for each ordered processes. Therefore, if the ordered process starts from the design process, design specification data is one of the "data needed for mask manufacturing." The mask manufacturing unit database 96 is connected to the portal site server 1 and stores performance information of the first through the third lithography units $5a_1$–$5a_3$, the fourth through the sixth lithography unit $5b_1$–$5b_3$, the seventh through the ninth lithography unit $5c_1$–$5c_3$, the tenth through the twelfth lithography unit $5d_1$–$5d_3$, the first CAD $5a_4$, the second CAD $5a_5$, the third CAD $5d_7$, the fourth CAD $5e_1$ through the sixth CAD $5e_3$, the seventh CAD $5f_1$ through the ninth CAD $5f_3$, the first developing unit $5c_4$, the second developing unit $5d_4$, the first ashing unit $5c_5$, the second ashing unit $5d_5$, the first mask check unit $5c_6$, the second mask check unit $5d_6$, the first etching unit $5c_8$, the second etching unit $5d_8$ and the adjustment unit $5d_9$.

LSI Mask Manufacturing Method

Figure 18:
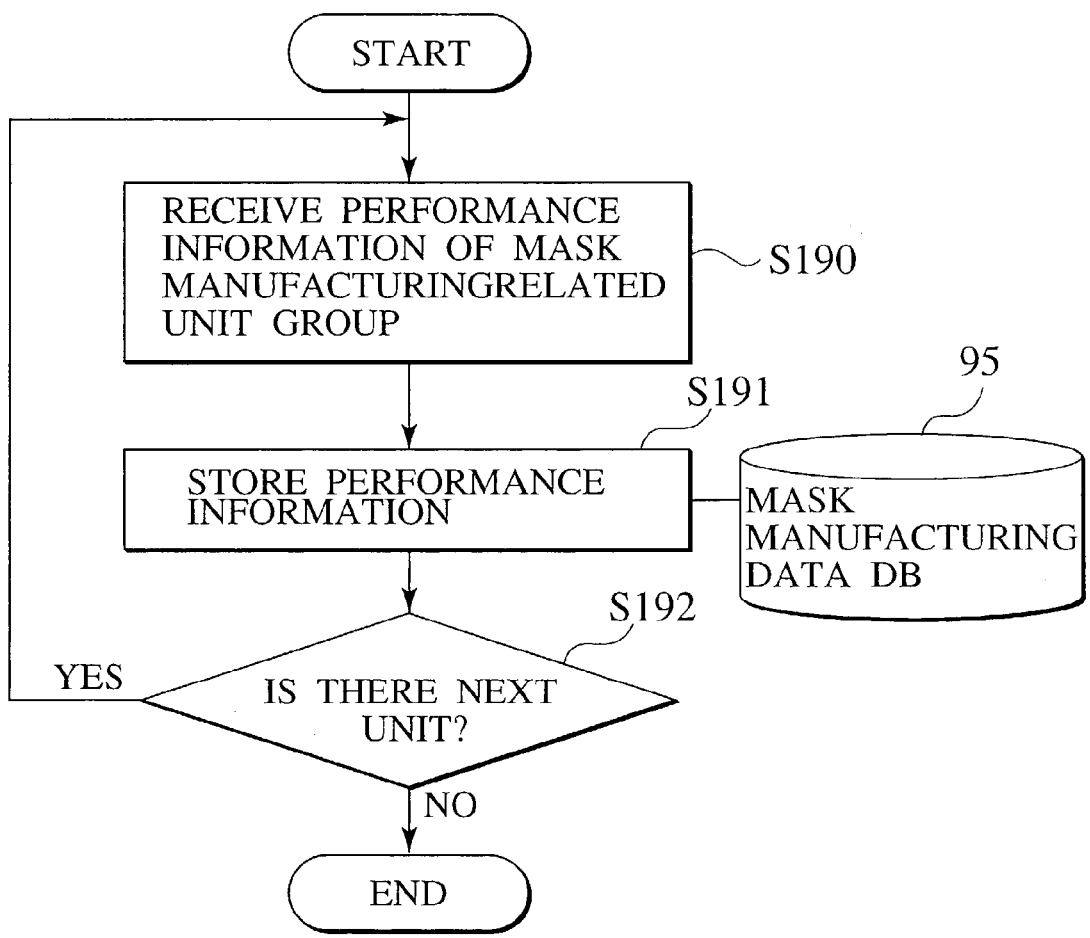
FIG. 18, FIG. 19A, and FIG. 19B are flowcharts illustrating the mask manufacturing method according to the second embodiment of the present invention.
Figure 19A:
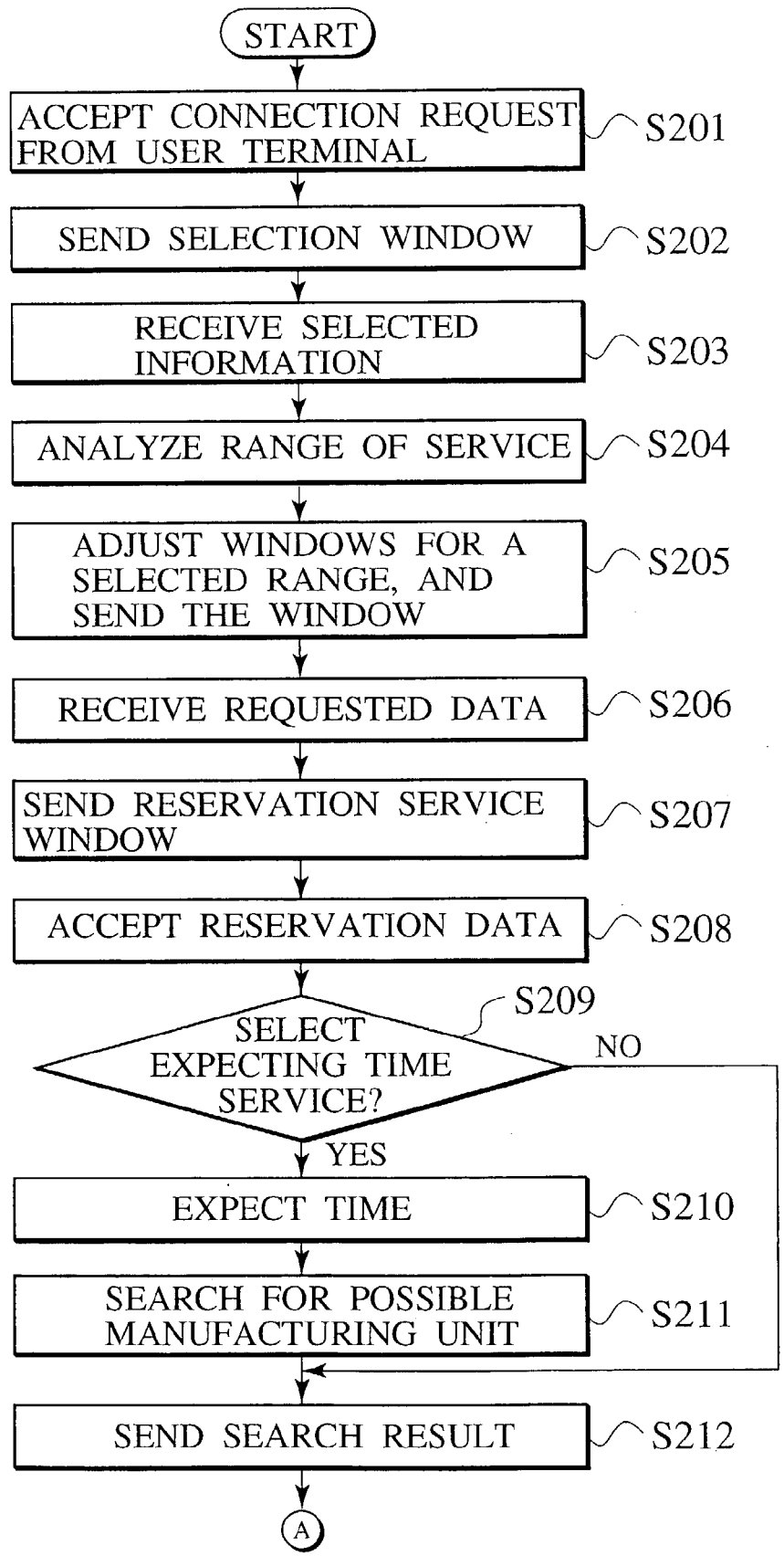
Figure 19B:
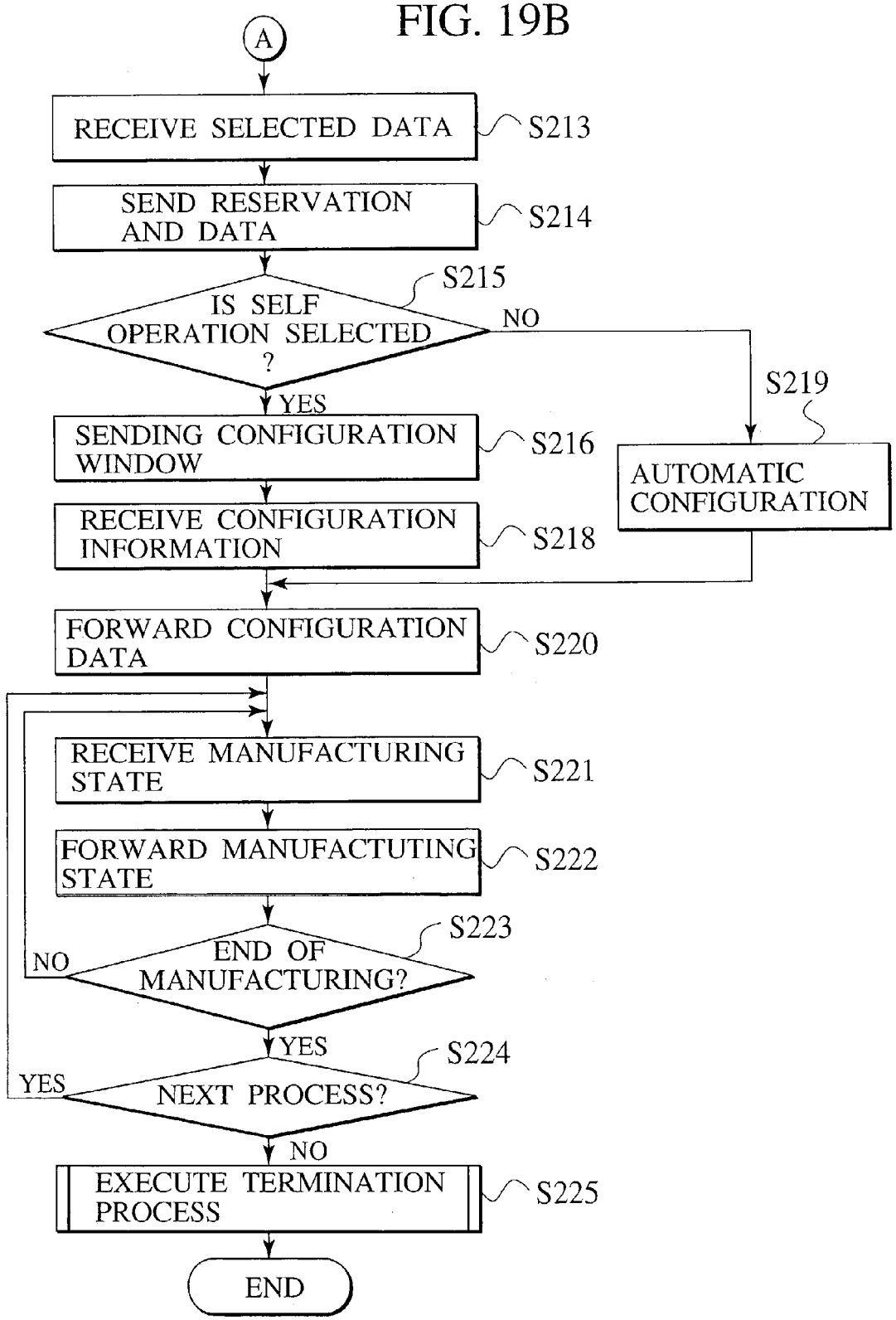

As shown in FIG. 18, FIG. 19A and FIG. 19B, an LSI mask manufacturing method of the second embodiment of the present invention will be explained.

Starting Process (a) In step S190 shown in FIG. 18, the portal site server 1 receives the detailed performance information from the each of the units connected to the first through the sixth host terminals $4a$–$4f$. For instance, these units connected to the host terminals $4a$–$4f$ are the first through the twelfth lithography unit $5a_1$–$5d_3$, the first through the ninth CAD $5a_4$–$5f_3$, the first and developing unit $5c_4$ and the second developing unit $5d_4$, the first ashing unit $5c_5$, the second ashing unit $5d_5$, the first mask check unit $5c_6$, the second mask check unit $5d_6$, the first etching unit $5c_8$, the second etching unit $5d_8$ and an adjustment unit $5d_9$.

(b) Then, in step S191, the portal site server 1 stores the detailed performance information of the units connected to the host terminals $4a$–$4f$ are stored in the mask manufacturing unit database 95.

(c) In step S192, the portal site server 1 determines whether or not there is a next unit to receive detailed performance information, and if there is a next unit, a process goes back to a process in step S190 to repeat the processes from step S190 to step S192. If there is not a next unit to receive the detailed information, receiving process is finished, and the process proceeds to a process in step S201 shown in FIG. 19A.

Figure 20:
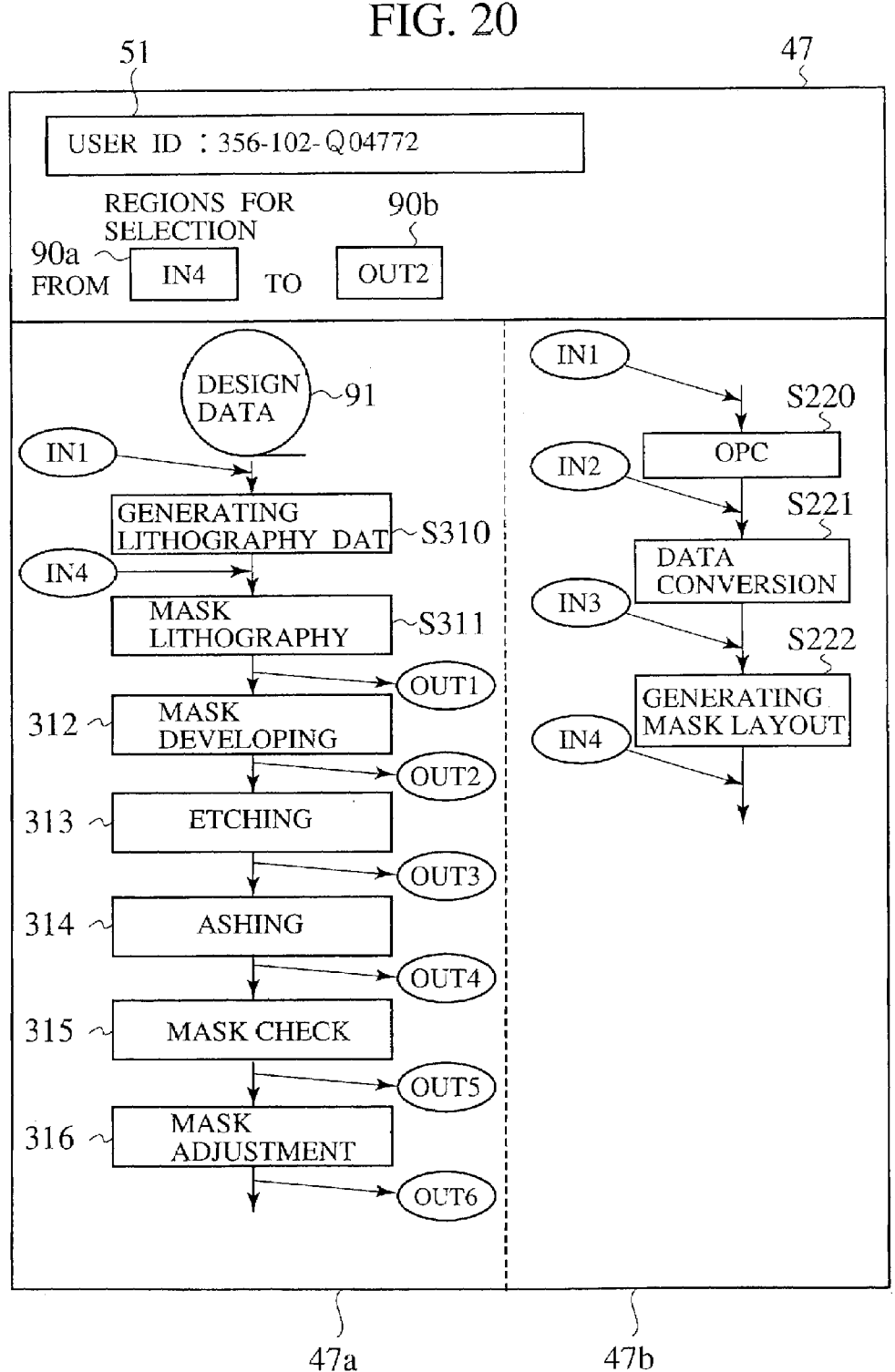
FIG. 20 is an example of the selection window of the second embodiment of the present invention.

Main Process (a) In step S201, the portal site server 1 receives and accepts a connection request from one of the first through the third user terminals $3a$–$3c$. In the second embodiment of the present invention, the portal site server 1 accepts connection from the second user terminal $3b$ in order to make the description easier. In step S202, the sending unit 9 of the portal site server 1 transmits a service selection window 47 to the second user terminal $3b$. In addition to a various services for the LSI mask manufacturing process explained in the first embodiment of the present invention (S15—S23 in FIG. 3B), the user may also select a various services of the mask manufacturing process in selection windows 47$a$ and 47$b$ as shown in FIG. 20. In the selection window 47$a$, the user may select services, such as a generating lithography data (S310), a mask lithography (S311), a mask developing (S312), an etching (S313), an ashing (S314), a mask check (S315) and a mask adjustment (S316). In the selection window 47b, the user may select a design process, such as an OPC (S320), a data conversion (S321) and a generating mask layout (S322). On the top of the service selection window 47, the user ID 51 is displayed, and in items 90a (starting process) and 90b (ending process), the user may select and input regions for the selection. For example, the user selects regions from "IN4" to "OUT2" as shown in FIG. 20. It means that the user select processes from the mask lithography (S311) through the mask developing (S312) in the service selection window 47. These items 90a and 90b may be input box where the user can input words and numbers or the items 90a and 90b may be a drop down menu where the user may select from the list. After the user selects services or processes, the portal site server 1 receives service selection information from the second user terminal 3b in step S203.

(b) In step S204, the ordered range determination unit 29 determines the selection information received from the second user terminal 3b to recognize which services are selected and what kinds of data must be received from the second user terminal 3b.

(c) When all the information is recognized, the sending unit 9 of the portal site server 1 adjusts a data request window for the selected range and sends the data request window to the second user terminal 3b in step S205. Then, in step S206, the portal site server 1 receives the requested data from the second user terminal 3b.

(d) In step S207, the sending unit 9 adjusts a reservation window for the selected range and sends the reservation window to the second user terminal 3b. Then, in step S208, the data receiving unit 21 receives detailed reservation information from the second user terminal 3b.

(e) In step S209, the portal site server 1 determines whether or not the expecting time process is selected. If the expecting time process is selected, the time prediction unit 22 predicts how long it takes to complete the requested processes based on the detailed reservation information in step S210. If the requested processes require a plural number of units, the time prediction unit 22 estimates the time required at each of the units and includes the time required for each of the units to communicate, such as transfer of data. For example, as shown in FIG. 20, the user select range from "IN4" to "OUT2". Therefore, the system requires a lithography unit and a developing unit, and the time prediction unit 22 estimates time needed at the lithography unit to perform a mask lithography process (S311) and time needed at the developing unit to perform a mask developing process (S312). Then, the time prediction unit 22 also estimates time needed for the lithography unit and the developing unit to transmit data to estimate how long it takes to finish the requested processes as an estimated result. Then, the time prediction unit 22 sends the estimated result to the second user terminal 3b. If the time prediction process is not selected in step S209, the process proceeds to a process in step S211.

(f) In step S211, the mask manufacturing machine searching unit 23 accesses to the mask manufacturing unit database 96 and searches for some mask manufacturing unit which fulfills the requested conditions based on the detailed reservation data. For instance, in the second embodiment of the present invention, the lithography unit and the developing unit are required to complete the requested processes. Therefore, based on the detailed reservation information, the mask manufacturing machine searching unit 23 searches for various varieties of units and machines stored in the mask manufacturing unit database 96. For example, as shown in FIG. 16, the third host terminal 4c and the fourth host terminal 4d have lithography units and developing units. Therefore, the mask manufacturing machine searching unit 23 may select a combination of one of the seventh through the ninth lithography units $5c_1$–$5c_2$ and the first developing unit $5c_4$ connected to the third host terminal 4c or another combination of one of the tenth through the twelfth lithography units $5d_1$–$5d_3$ and the second developing unit $5d_4$ connected to the fourth host terminal 4d. If only the first lithography unit 5a1 can perform the requested lithography process, the mask manufacturing machine searching unit 23 may select the first lithography nit $5a_1$ and one of the first or second developing units $5c_4$ and $5d_4$. After the mask manufacturing machine searching unit 23 searches and select combinations of the mask manufacturing machines and units, the mask manufacturing machine searching unit 23 sends a search result to the second user terminal 3b in step S212.

(g) In step S213 shown in FIG. 19B, the portal site server 1 receives the selection data from the second user terminal 3b. Then, in step S214, the mask manufacturing machine reservation unit 24 make a reservation to the selected machines based on received selection data from the second user terminal 3b in step S213 and sends all data needed for the processes to the selected machines or units. For instance, in the second embodiment of the present invention, the user selects the combination of the first lithography unit $5a_1$ and the second developing unit $5d_4$ as a first choice. Therefore, the mask manufacturing machine reservation unit 24 tries to reserve the use of the first lithography unit $5a_1$ and the second developing unit $5d_4$. If the mask manufacturing machine reservation unit 24 is able to make a reservation at each of the first lithography unit $5a_1$ and the second developing unit $5d_4$, the mask manufacturing machine reservation unit 24 sends the reservation data and other data needed for the requested process are sent to each of the first lithography unit $5a_1$ and the second developing unit $5d_4$.

(h) In step S215, the configuration unit 25 determines whether or not the second user terminal 3b requests for a manual set up. IF the second user terminal 3b does not request for the manual set up, the portal site server 1 executes for an automatic setup in step S219, and the process proceeds to a process in step S220. If the second user terminal 3b requests for the manual setup, the sending unit 9 sends the configuration window to the second user terminal 3b in step S216. Then, in step S217, the portal site server 1 receives configuration information from the second user terminal 3b and sends the configuration information to each of the mask manufacturing units, such as the first lithography unit $5a_1$ and the second developing unit $5d_4$.

(i) In step S221, the monitoring unit 26 receives progress reports from each of the first lithography unit $5a_1$ and the second developing unit $5d_4$. Then, in step S222, the monitoring unit 26 sends the progress reports to the second user terminal 3b. In step S223, the monitoring unit 26 determines whether or not processes in each of the mask manufacturing units are finished. For instance, in the selection window 47 shown in FIG. 20, the user requests for the processes from "IN4" through "OUT2." Therefore, in step S223, the monitoring unit 26 determines whether the lithography process (S311) is finished at first.

(j) If the lithography process (S311) is finished, the monitoring unit 26 determines whether or not there is a next process to execute. If there is a next process to execute, the process goes back to the process in step S221, and the monitoring unit 26 receives progress reports from a next mask manufacturing unit and sends the progress reports to the second user terminal 3b. In other words, if the lithography process (S311) is finished, the processes in step S221 through step S224 are executed for the developing process (S312). When the process hits the end of the specified range, the process ends and proceeds to the termination process in step S225.

Termination Process

Figure 19C:
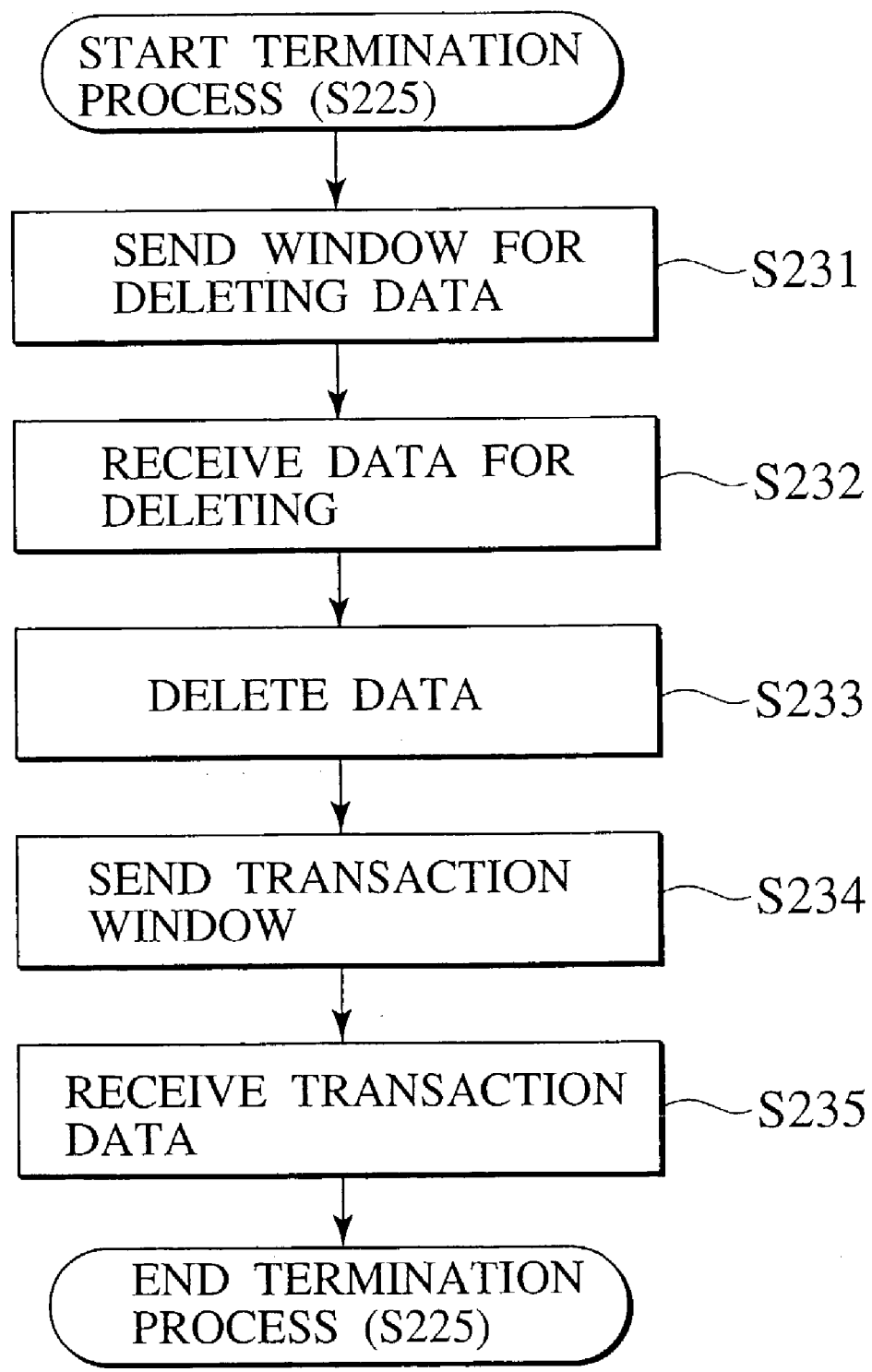
FIG. 19C is a flowchart illustrating the termination process shown in FIG. 19B.

As shown in FIG. 19C, the termination process will be explained.

(a) In step S231, the sending unit 9 sends the data deletion window to the second user terminal 3b. Then, at the data deletion window, the user selects and inputs information about data, which the user wants to delete. Then, the user sends the information to the portal site server 1 when the portal site server 1 receives the information from the second user terminal 3b.

(b) Based on received information, the data deleting unit 27 deletes specified data in specified mask manufacturing unit in step S233. These deleted data are stored in the portal site server 1, but deleted from the mask manufacturing unit in step S233.

(c) when the deletion process of the data is finished, the charging unit 28 sends the charging window to the second user terminal 3b and requests user for a payment in step S234. Generally, the user is charged for an actual time period, in which the mask manufacturing unit is in work.

(d) In step S235, the portal site server 1 finishes with the processes for the second embodiment of the present invention, when the portal site server 1 receives the payment data from the second user terminal 3b.

The function of the LSI mask manufacturing system and method of the second embodiment of the present invention may be programmed and saved in a computer-readable recording medium. For the LSI mask manufacturing method of the second embodiment of the present invention, the programs saved in the recording medium is transferred to a memory in a computer system and then operated by its operating unit, thus putting the method in practice. The recording medium may be selected from semiconductor memories, magnetic disks, optical disks, optomagnetic disks, magnetic tapes, and any of the computer-readable recording mediums.

The LSI mask manufacturing system, method and program according to the second embodiment of the present invention provides a system, a method and a program that a user can select and control the schedules and the lithography units. In addition, the LSI mask manufacturing system, method and program according to the second embodiment of the present invention also provides a system, a method and a program that is able to manufacture masks without leaking confidential information, related to lithography data and process conditions for LSI mask manufacturing, to a third person. Furthermore, the LSI mask manufacturing system, method and program according to the second embodiment of the present invention also provides a system, a method and a program that is able to reduce the personnel expenses to provide an LSI mask manufacturing system by introducing an online ordering system. In addition, the LSI mask manufacturing system, method and program according to the second embodiment of the present invention may also provide a system, a method and a program that is able to reduce costs for LSI mask manufacturing since the user does not have to own units and machines, although low in the rate of operation, but needed for a special use or for applying high technologies. The user may share these special units with other users by using the LSI mask manufacturing system, method and program according to the first embodiment of the present invention. In addition, the LSI mask manufacturing system, method and program according to the second embodiment of the present invention may also provide a system, a method and a program to a wide range of users from small business users to major users (large business users).

OTHER EMBODIMENT

Although the embodiments of the present invention have been described in detail, the invention may be embodied in other specific forms without departing from the spirit or essential characteristics thereof.

The first lithography unit $5a_1$ through the third lithography unit $5a_3$, the first CAD $5a_4$, the second CAD $5a_5$, the fourth lithography unit $5b_1$–the sixth lithography unit $5b_3$, the seventh lithography unit $5c_1$–the ninth lithography unit $5c_3$, the first developing unit $5c_4$, the first ashing unit $5c_5$, the first mask check unit $5c_6$, the first etching unit $5c_8$, the tenth lithography unit $5d_1$–the twelfth lithography unit $5d_3$, the second developing unit $5d_4$, the second ashing unit $5d_5$, the second mask check unit $5d_6$, the third CAD $5d_7$, the second etching unit $5d_8$, the adjustment unit $5d_9$, the fourth CAD $5e_1$–the sixth CAD $5e_3$ and the seventh CAD $5f_1$–the ninth CAD $5f_3$ may be connected to the first through the sixth host terminals, which is connected to the network 6 or may be directly connected to the network 6.

The first host terminal 4a through the sixth host terminal 4f may be connected to the network 6 in domestic level or in the international level. In other words, some of the host terminals may be connected to the network 6 in different countries.

The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An LSI mask manufacturing system, comprising:
a network:
a user terminal;
a host terminal configured to be connected to the network;
lithography units configured to be connected to the host terminal; and
a portal site server configured to be connected to the network and the user terminal comprising;
a lithography data receiving unit configured to receive lithography data and a lithography reservation condition for a lithography process from the user terminal;
a lithography data database configured to store the lithography data;
a lithography unit database configured to store performance information for at least one of the lithography units;
a lithography unit searching unit configured to search for a lithography unit matching the lithography reservation condition, generate a list of lithography units, and send the list to the user terminal; and
a lithography unit reservation unit configured to receive a specification of a lithography unit from the user terminal and send a lithography request to the lithography unit specified by the user terminal.

2. The system of claim 1 further comprising a lithography charging unit configured to calculate a charging amount based on an actual used time at the lithography unit and send a bill to the user terminal.

3. The system of claim 1 further comprising a lithography data deleting unit configured to delete the lithography data from the lithography data database.

4. The system of claim 1 further comprising:
a lithography time prediction unit configured to estimate a lithography time based on the lithography reservation condition;
a lithography configuration unit configured to setup detail of a lithography condition for LSI mask manufacturing at the lithography unit; and
a lithography monitoring unit configured to receive a lithography state from the lithography unit and send the lithography state to the user terminal.

5. An LSI mask manufacturing system, comprising:
a network;
a user terminal;
a host terminal configured to be connected to the network;
mask manufacturing units configured to be connected to the host terminal; and
a portal site server configured to be connected to the network and the user terminal comprising:
a data receiving unit configured to receive data and a reservation condition for LSI mask manufacturing from the user terminal;
a mask manufacturing data database configured to store the data and the reservation condition;
a mask manufacturing unit database configured to store performance information of the mask manufacturing unit;
an ordered range determination unit configured to determine an ordered range based on the reservation condition;
a mask manufacturing machine searching unit configured to search for a mask manufacturing unit matching the reservation condition, generate a list of mask manufacturing units, and send the list to the user terminal; and
a mask manufacturing machine reservation unit configured to receive a specification of a mask manufacturing unit from the user terminal and send a request to the mask manufacturing unit specified by the user terminal.

6. The system of claim 5 further comprising a charging unit configured to calculate a charging amount based on an actual used time at the mask manufacturing unit and send a bill to the user terminal.

7. The system of claim 5 further comprising a data deleting unit configured to delete the data from the mask manufacturing unit.

8. The system of claim 5 further comprising:
a time prediction unit configured to estimate a mask manufacturing time at the mask manufacturing unit specified by the user terminal based on the reservation condition;
a configuration unit configured to setup detail of a condition for mask manufacturing at the mask manufacturing unit specified by the user terminal; and
a monitoring unit configured to receive a mask manufacturing state from the mask manufacturing unit specified by the user terminal and send the mask manufacturing state to the user terminal.

9. The system of claim 5, wherein the mask manufacturing unit comprises:

a CAD unit configured to design a mask pattern based on a design data and generate a lithography data for a mask;
a lithography unit configured to expose the mask pattern on to a resist film of the mask;
a developing unit configured to develop the resist film exposed at the lithography unit;
an etching unit configured to etch a shielded layer of the mask based on the resist film developed by the developing unit;
an ashing unit configured to remove the resist film from the mask;
a mask check unit configured to check for an error of the mask pattern; and
an adjusting unit configured to adjust the error of the mask pattern.

10. The system of claim 9, wherein the ordered range comprises at least one of the CAD unit, the lithography unit, the developing unit, the etching unit, the ashing unit, the mask check unit and the adjusting unit.

11. A computer implemented method for LSI mask manufacturing comprising:
storing performance information of a lithography unit, connected to a network, in a lithography unit database;
receiving a lithography data and a lithography reservation condition from a user terminal connected to the network;
storing the lithography data in a lithography data database;
searching for a lithography unit matching to the lithography reservation condition, generating a list of lithography units, and sending the list to the user terminal; and
receiving information of a lithography unit specified by the user terminal and sending a lithography request to the lithography unit specified by the user terminal.

12. The method of claim 11 further comprising:
calculating a charging amount based on an actual used time of the lithography unit; and sending a bill to the user terminal.

13. The method of claim 11 further comprising deleting the lithography data from the lithography data database.

14. The method of claim 11 further comprising:
estimating a lithography time based on the lithography reservation condition;
setting up detail of a lithography condition for LSI mask manufacturing at the lithography unit; and receiving a lithography state from the lithography unit and sending the lithography state to the user terminal.

15. A computer implemented method for LSI mask manufacturing, the method comprising:
storing performance information of a mask manufacturing unit, connected to a network, in a mask manufacturing unit database;
receiving data and a reservation condition from a user terminal connected to the network;
storing the data in a mask manufacturing data database;
determining a ordered range based on the reservation condition;
searching for a mask manufacturing unit marching to the reservation condition, generating a list of mask manufacturing units, and sending the list to the user terminal; and
receiving information of a mask manufacturing unit specified by the user terminal and sending a request to the mask manufacturing unit specified by the user terminal.

16. The method of claim 15, further comprising:

calculating a charging amount based on an actual used time of the mask manufacturing unit;

sending a bill to the user terminal; and deleting the data from the mask manufacturing unit specified by the user terminal.

17. The method of claim 15, further comprising:

estimating a mask manufacturing time based on the reservation condition;

setting up detail of a mask manufacturing condition at the mask manufacturing unit; and receiving a mask manufacturing state from the mask manufacturing unit and sending the mask manufacturing state to the user terminal.

18. The method of claim 15, wherein the mask manufacturing unit comprises:

a CAD unit configured to design a mask pattern based on a design data and generate a lithography data for a mask;

a lithography unit configured to expose the mask pattern on to a resist film of the mask;

a developing unit configured to develop the resist film exposed at the lithography unit;

an etching unit configured to etch a shielded layer of the mask based on the resist film developed by the developing unit;

an ashing unit configured to remove the resist film from the mask;

a mask check unit configured to check for an error of the mask pattern; and an adjusting unit configured to adjust the error of the mask pattern.

19. An executable computer program embodied on a computer readable medium for use with a mask manufacturing unit, the computer program product comprising:

instructions to store performance information of a lithography unit, connected to a network, in a lithography unit database;

instructions to receive a lithography data and a lithography reservation condition from a user terminal connected to the network;

instructions to store the lithography data in a lithography data database;

instructions to search for a lithography unit matching the lithography reservation condition, generate a list of lithography units, and send the list to the user terminal; and instructions to receive information of a lithography unit specified by the user terminal and send a lithography request to the lithography unit specified by the user terminal.

20. An executable computer program embodied, on a computer readable medium for use with a mask manufacturing unit the computer program product comprising:

instructions to store performance information of a mask manufacturing unit, connected to a network, in a mask manufacturing unit database;

instructions to receive data and a reservation condition from a user terminal connected to the network;

instructions to store the data in a mask manufacturing data database;

instructions to determine an ordered range based on the reservation condition;

instructions to search for a mask manufacturing unit matching to the reservation condition, generate a list of mask manufacturing units, and send the list to the user terminal; and instructions to receive information of a mask manufacturing unit specified by the user terminal and send a request to the mask manufacturing unit specified by the user terminal.

* * * * *